(12) United States Patent  
Zhu et al.

(10) Patent No.: US 12,347,830 B2  
(45) Date of Patent: Jul. 1, 2025

(54) INTERFACE DESIGN FOR HIGH CURRENT DENSITY CYCLING OF SOLID STATE BATTERY

(71) Applicant: UCHICAGO ARGONNE, LLC, Chicago, IL (US)

(72) Inventors: Yisi Zhu, Naperville, IL (US); Sanja Tepavcevic, Chicago, IL (US); Justin Grant Connell, Chicago, IL (US); Peter Zapol, Hinsdale, IL (US); Nenad Markovic, Hinsdale, IL (US)

(73) Assignee: UCHICAGO ARGONNE, LLC, Chicago, IL (US)

( * ) Notice: Subject to any disclaimer, the term of this patent is extended or adjusted under 35 U.S.C. 154(b) by 367 days.

(21) Appl. No.: 16/784,543

(22) Filed: Feb. 7, 2020

(65) Prior Publication Data

US 2021/0249693 A1    Aug. 12, 2021

(51) Int. Cl.
*H01M 4/38* (2006.01)
*H01M 4/40* (2006.01)
(Continued)

(52) U.S. Cl.
CPC ....... *H01M 10/0585* (2013.01); *H01M 4/382* (2013.01); *H01M 4/405* (2013.01);
(Continued)

(58) Field of Classification Search
CPC .. H01M 10/0585; H01M 4/382; H01M 4/405; H01M 4/505; H01M 4/525;
(Continued)

(56) References Cited

U.S. PATENT DOCUMENTS

| | | |
|---|---|---|
| 5,448,080 A | 9/1995 | Han et al. |
| 2010/0291431 A1* | 11/2010 | Shih ........................ H01M 6/40 29/623.2 |

(Continued)

FOREIGN PATENT DOCUMENTS

| | | | | |
|---|---|---|---|---|
| CN | 102749726 A | | 10/2012 | |
| CN | 108365152 A | * | 8/2018 | ........ H01M 10/4235 |

(Continued)

OTHER PUBLICATIONS

Author: Lei Fan, Shuya Wei, Siyuan Li, Qi Li, Yingying Lu, Title: "Recent progress of the Solid-State Electrolytes for High-Energy Metal-Based Batteries", Advanced Energy Materials vol. 8, 1702657, Date: Jan. 26, 2018 (Year: 2018).*

(Continued)

*Primary Examiner* — Ekandra S. Miller-Cruz
*Assistant Examiner* — Jared Hansen
(74) *Attorney, Agent, or Firm* — MARSHALL, GERSTEIN & BORUN LLP

(57) ABSTRACT

Solid-state batteries offer improved safety and the high-energy-density capabilities required for next generation demands of electric vehicles. Disclosed is a method for fabricating high-current-density solid-state batteries, and the associated device structures and systems. The method of fabrication includes purifying surfaces of a solid electrolyte, depositing materials to form deposition layers on the surfaces of the solid electrolyte in a vacuum, and forming oxygen-deficient interfaces at the interface of the deposition layers and the solid electrolyte. The methods and associated devices form high-current-density solid-state batteries with stable electrochemical performance over hundreds of electric cycles.

16 Claims, 9 Drawing Sheets

(51) Int. Cl.

| | | |
|---|---|---|
| *H01M 4/505* | (2010.01) | |
| *H01M 4/525* | (2010.01) | |
| *H01M 4/58* | (2010.01) | |
| *H01M 10/052* | (2010.01) | |
| *H01M 10/0562* | (2010.01) | |
| *H01M 10/0585* | (2010.01) | |

(52) U.S. Cl.
CPC ........... *H01M 4/505* (2013.01); *H01M 4/525* (2013.01); *H01M 4/5825* (2013.01); *H01M 10/052* (2013.01); *H01M 10/0562* (2013.01); H01M 2300/0071 (2013.01)

(58) Field of Classification Search
CPC ............. H01M 4/5825; H01M 10/052; H01M 10/0562; H01M 2300/0071; H01M 2300/0077; H01M 4/131; Y02E 60/10; Y02P 70/50
See application file for complete search history.

(56) References Cited

U.S. PATENT DOCUMENTS

| | | | | |
|---|---|---|---|---|
| 2014/0087092 A1* | 3/2014 | Nieh | ..................... | H01M 4/139 |
| | | | | 118/723 VE |
| 2016/0248117 A1* | 8/2016 | Liang | ..................... | C23C 14/08 |
| 2016/0301063 A1* | 10/2016 | Yukinobu | ............. | H01M 4/049 |
| 2017/0179472 A1* | 6/2017 | Allie | ................... | H01M 10/052 |
| 2018/0301752 A1 | 10/2018 | Sakamoto et al. | | |
| 2020/0052326 A1* | 2/2020 | Hu | ....................... | H01M 10/0525 |
| 2020/0358086 A1* | 11/2020 | Hu | ....................... | H01M 10/052 |
| 2021/0194045 A1* | 6/2021 | Beck | ................. | H01M 10/0525 |
| 2024/0113279 A1* | 4/2024 | Hu | ........................ | H01M 4/134 |

FOREIGN PATENT DOCUMENTS

| | | | | |
|---|---|---|---|---|
| CN | 208315666 U | * | 1/2019 | |
| CN | 108365152 B | * | 9/2020 | ........ H01M 10/4235 |
| WO | WO-2016196688 A1 | * | 12/2016 | ............ H01M 4/049 |
| WO | WO-2019193324 A1 | * | 10/2019 | ........ H01M 10/4235 |

OTHER PUBLICATIONS

Author: Jianneng Liang, Jing Luo, Qian Sun, Xiaofei Yang, Ruying Li, Xueliang Sun, Title: "Recent progress on solid-state hybrid electrolytes for solid-state lithium batteries", Energy Storage Materials vol. 21, 308, Date: Sep. 2019 (Year: 2019).*

CN108365152B, machine English translation of document, Inventor: Zhang Qiang; Zhao Chenzi; Cheng Xinbing, Title: "Composite separator for lithium battery", Date: Feb. 28, 2022 retrieved from https://worldwide.espacenet.com/ (Year: 2020).*

Yonemoto, Fumihiro, et al. "Temperature effects on cycling stability of Li plating/stripping on Ta-doped Li7La3Zr2O12." Journal of Power Sources 343 (2017): 207-215. (Year: 2017).*

CN108365152A, Zhang Qiang; Zhao Chenzi; Cheng Xinbing, "Composite separator for lithium battery", retrieved from https://worldwide.espacenet.com/ Oct. 13, 2022 (Year: 2018).*

Senevirathne, Keerthi, et al. "A new crystalline LiPON electrolyte: Synthesis, properties, and electronic structure." Solid State Ionics 233 (2013): 95-101 (Year: 2013).*

Xiong, Yuli, et al. "Effects of annealing temperature on structure and opt-electric properties of ion-conducting LLTO thin films prepared by RF magnetron sputtering." Journal of Alloys and Compounds 509.5 (2011): 1910-1914 (Year: 2011).*

Nong, Jian, et al. "Properties and preparation of Li—La—Ti—Zr—O thin film electrolyte." Materials Letters 154 (2015): 167-169 (Year: 2015).*

Jena, Anirudha, et al. "Ameliorating interfacial ionic transportation in all-solid-state Li-ion batteries with interlayer modifications." ACS Energy Letters 3.11 (2018): 2775-2795 (Year: 2018).*

Duvel, Andre, et al. "Mechanosynthesis of solid electrolytes: preparation, characterization, and Li ion transport properties of garnet-type Al-doped Li7La3Zr2O12 crystallizing with cubic symmetry." The Journal of Physical Chemistry C 116.29 (2012): 15192-15202. (Year: 2012).*

Wenzel, Sebastian, et al. "Interphase formation on lithium solid electrolytes—An in situ approach to study interfacial reactions by photoelectron spectroscopy." Solid State Ionics 278 (2015): 98-105. (Year: 2015).*

Lu, Yang, et al. "An in situ element permeation constructed high endurance Li-LLZO interface at high current densities." Journal of Materials Chemistry A 6.39 (2018): 18853-18858. (Year: 2018).*

CN208315666U, Wang, et al. "Lithium anode prefabricated component, lithium anode and lithium metal secondary cell", machine English translation retrieved from https://worldwide.espacenet.com Date: Jan. 27, 2025 (Year: 2019).*

Sastre et al., Aluminum-Assisted Densification of Cosputtered Lithium Garnet Electrolyte Films for Solid-State Batteries, ACS Applied Energy Materials 2019 2 (12), 8511-8524.

Balaish et al., "Processing thin but robust electrolytes for solid-state batteries," Nature Energy, vol. 6, pp. 227-239, Mar. 2021.

Connell et al., Crystal Orientation—Dependent Reactivity of Oxide Surfaces in Contact with Lithium Metal, ACS Applied Materials & Interfaces 2018 10(20):17471-9.

Peloton et al., Carrier Cooling in Colloidal Quantum Wells, Nano Lett. 2012, 12, 12, 6158-6163.

Tepavcevic et al. Advanced Solid-State Interfaces in Li-ion Batteries, presented at Lithium Metal Anode Deep Dive Meeting, Aug. 28-29, 2018, Pittsburgh, Pennsylvania.

Thompson et al., Electrochemical Window of the Li-Ion Solid Electrolyte $Li_7La_3Zr_2O_{12}$, ACS Energy Letters, 2017, 2, 462.

Zhu et al., Dopant-Dependent Stability of Garnet Solid Electrolyte Interfaces with Lithium Metal, Adv. Energy Mater. 2019, 9, 1803440.

* cited by examiner

| Samples | | Concentration [%] | | |
|---|---|---|---|---|
| | | $Li_2CO_3$ | LiOH | LLZO |
| A: $Li_{6.25}Al_{0.25}La_3Zr_2O_{12}$ | Unpolished: | 25.3 | 34.7 | 40.0 |
| | Polished: | 10.1 | 43.3 | 46.6 |
| | 80°C: | 18.2 | 4.2 | 77.6 |
| | 500°C: | 0.0 | 4.5 | 95.5 |
| B: $Li_{6.5}La_3Zr_{1.5}Nb_{0.5}O_{12}$ | Unpolished: | 23.7 | 35.0 | 41.3 |
| | Polished: | 9.3 | 43.0 | 47.7 |
| | 80°C: | 11.8 | 9.9 | 78.3 |
| | 500°C: | 0.0 | 6.6 | 93.4 |
| C: $Li_{6.5}La_3Zr_{1.5}Ta_{0.5}O_{12}$ | Unpolished: | 26.7 | 22.2 | 51.1 |
| | Polished: | 12.1 | 37.0 | 50.9 |
| | 80°C: | 20.3 | 7.2 | 72.5 |
| | 500°C: | 0.0 | 3.7 | 96.3 |

FIG. 9

INTERFACE DESIGN FOR HIGH CURRENT DENSITY CYCLING OF SOLID STATE BATTERY

STATEMENT REGARDING FEDERALLY SPONSORED RESEARCH OR DEVELOPMENT

This invention was made with government support under Contract No. DE-AC02-06CH11357 awarded by the United States Department of Energy to UChicago Argonne, LLC, operator of Argonne National Laboratory. The government has certain rights in the invention.

FIELD OF THE DISCLOSURE

The present disclosure relates to high-current-density solid-state battery cells and interfacial fabrication methods of manufacturing the same.

BACKGROUND

Solid-state batteries are an emergent technology with advantages over liquid electrolyte-based batteries. Solid-state batteries utilize a solid electrolyte, which allows for higher energy densities, wider electrochemical stability windows, broader operating temperature ranges, and improved safety. Some solid-state batteries are even emerging as a promising technology to meet the demands of next generation electric vehicles. Lithium lanthanum zirconium oxide (LLZO) based solid electrolytes are a particularly promising class of materials for solid-state batteries due to their wide electrochemical stability windows, the ability to synthesize them with very high density, and the ability to achieve room-temperature conductivities of around 1 mS cm$^{-1}$.

Although LLZO-based electrolytes are a promising material for the next generation of solid-state batteries, there are still many fundamental issues that remain. Currently, LLZO-based electrolytic solid-state batteries exhibit low accessible current densities and the persistence of dendrite formation in the electrolyte can cause short circuits leading to battery failure. For example, the long-term, room-temperature cycling of modern solid-state battery cells has been limited to maximum current densities of ~1 mA cm$^{-2}$, which falls short of the ≥3 mA cm$^{-2}$ standard set by the United States' Advanced Research Projects Agency—Energy for solid-state systems to match the performance of existing lithium ion systems for electric vehicles. Additionally, the interfaces between the solid electrolyte and high-voltage oxide cathodes can be unstable over long periods of time. Due to the above enumerated drawbacks, significant electrochemical reactivity in LLZO-based electrolyte solid-state batteries ultimately leads to premature battery cell failure during extended periods of cycling.

Contact losses associated with morphological instabilities (e.g., vacancy accumulation and pore formation) are commonly found to be responsible for an increase in interfacial resistance, and eventual battery cell failure. One possible method for increasing the maximum achievable current density of solid-state batteries is, therefore, to maintain uniform interfacial contact between metal contact surfaces and the solid electrolyte. One approach to improving the interfacial contact of a solid-state battery is to induce plastic deformation of the metallic surface by applying external pressure and/or performing preconditioning at elevated temperatures. It has been demonstrated that preconditioning while heating can reduce the metal-electrolyte interfacial resistance by improving wetting and physical contact. However, electrochemical cycling under high pressures or elevated temperatures is not always desirable or technically feasible. Other approaches introduce alloys (e.g., Al, Au, etc.) at the interface of the metal and the solid electrolyte. Despite improvements in initial performance, during long-term battery operation the alloys do not remain at the solid electrolyte interface, which can lead to shortages and reduced battery lifetimes. Other approaches to increase solid-state battery lifetimes and current densities have also been attempted, however, modern attempts have only managed to increase the cycle life of some battery cells with current densities above 1 mA cm$^{-2}$ at 25° C., which is still unachievable for most solid-state electrolyte materials and battery cell types.

SUMMARY OF THE DISCLOSURE

A solid-state battery cell having a first substrate being a first electrode, a second substrate being a second electrode, and a solid electrolyte extending between the first and second electrodes. The solid-state battery cell further includes a first oxygen-deficient interface layer at the interface of the electrolyte and the first electrode.

A method of fabricating a solid-state battery cell includes removing impurities from first and second surfaces of a solid electrolyte, depositing a first deposition layer on the first surface of the solid electrolyte, and depositing a second deposition layer on the second surface of the solid electrolyte. The depositing of the first deposition layer and second deposition layer being performed in a vacuum.

A solid-state battery cell having a first lithium electrode, a second lithium electrode, and a solid, doped or undoped, lithium lanthanum zirconium oxide (LLZO) electrolyte extending between the first and second electrodes. The solid-state battery cell further includes a first lithium deposition layer on a first surface of the solid electrolyte, with the first deposition layer extending between the first electrode and the first surface of the solid electrolyte, and a second lithium deposition layer on a second surface of the solid electrolyte, with the second deposition layer extending between the second electrode and the second electrolyte. The solid-state battery further includes an oxygen-deficient interface layer at the interface of the first lithium deposition layer and the first surface of the solid electrolyte, and a second oxygen-deficient interface layer at the interface of the second lithium deposition layer and the second surface of the solid electrolyte.

A method of fabricating a solid-state battery cell includes sanding a first and second surface of a LLZO substrate, heating the LLZO substrate in a vacuum, depositing a first lithium deposition layer on the first surface of the LLZO substrate in a vacuum, and, in embodiments, the second surface of the LLZO substrate is in contact with a cathode material. The method further includes pressing a first lithium electrode against the first lithium deposition layer, with the first lithium electrode configured to be in electrical communication with the first lithium deposition layer, and pressing a second lithium electrode against the cathode material, with the second lithium electrode configured to be in electrical communication with the cathode material.

BRIEF DESCRIPTION OF THE DRAWINGS

The following detailed description will be more easily and better understood when considered in conjunction with the following figures, in which like reference numbers are employed to designate like structures. It should be understood that, with the exception of magnified images, the drawings are not to scale, as scaled drawings would not facilitate an understanding of the depicted structures.

FIG. 9 is a table of impurity values of doped LLZO solid electrolytes for various cleaning processes.

DETAILED DESCRIPTION

Figure 1:
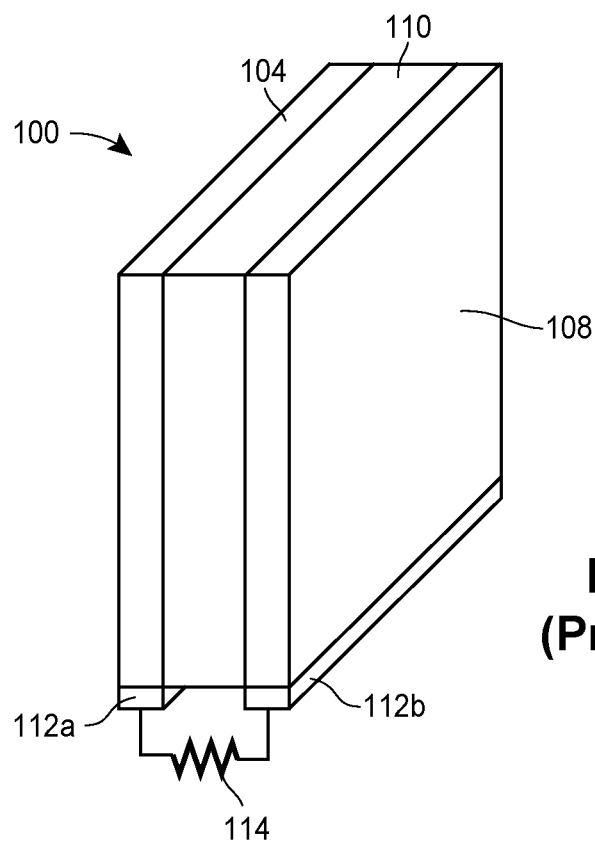
FIG. 1 illustrates an embodiment of a prior art solid-state battery cell architecture including an anode, a cathode, and an electrolyte between the anode and the cathode.

Solid electrolytes based on doped or undoped lithium lanthanum zirconium oxide (LLZO) represent a promising class of materials for all-solid-state-batteries due to their wide electrochemical stability windows and high Li-ion conductivities of ~1.0 mS cm$^{-1}$ at 25° C. Currently, lithium-conducting-oxide solid electrolytes cannot withstand high current density cycling with lithium metal (>1 mA/cm$^2$) at room temperature without shorting. Conventional means of increasing current density cycling, such as operating lithium electrolyte battery cells at elevated temperatures (e.g., 75-100° C.), or coating them with another material, are not viable solutions, as it is not practical to operate battery cells at greater than 50° C., and coatings only offer temporary protection from cell failure. As such, the current densities and battery lifetimes of LLZO need to be improved if they are to be viable options, such as for implementation in electric automobile technologies and other next-generation battery applications. To increase the viability for use of LLZO solid-state batteries for many applications, the accessible current densities need to be increased, and the interfaces with both Li metal anodes and transition metal oxide cathodes need to be stabilized to enable extended cycling and battery lifetime. As described above, contact losses associated with morphological instabilities (e.g., vacancy accumulation and pore formation) cause an increase in interfacial impedance and eventual cell failure. Therefore, maintaining uniform contact between the lithium metal and the solid electrolyte can be advantageous for efficient, long-term plating and stripping of lithium. According to the methods and systems described herein, it was surprisingly and beneficially found that the fabricated solid-state battery cells could be electrically cycled at 2 mA cm-2 or greater, for hundreds of cycles, without electrochemical degradation. Without intending to be bound by theory, the process methods described herein are believed to provide higher current density battery cells due to an oxygen deficient interface disposed between the solid electrolyte and the anode and cathode.

The presence of surface contaminants at interfaces of solid-state battery cells (e.g., at the electrode electrolyte interface) can result in solid-state batteries with reduced battery lifetimes or cycling current densities under 2 mA cm$^{-2}$. Contaminants may include any reactive species that alters the electrochemical characteristics of the solid-state battery cell causing the battery cell not to cycle with the high-current densities, and long cycle lifetimes as described herein. Typical contaminants generally include $H_2O$, $CO_2$, $O_2$, $N_2$, or any species of contaminant deriving from reactions with species in air. The contaminant material may be dependent on the specific solid electrolyte material.

In embodiments, potential contaminants may include carbonates, hydroxides and zirconias, which can form reaction layers that increase interfacial impedance and reduce overall cycling performance, greatly affects the electrochemical behavior of LLZO-based materials. LLZO-based solid electrolytes form $Li_2CO_3$ and $LiOH$ reaction layers when exposed to $CO_2$ and $H_2O$, respectively. The formation of the reaction layers on the LLZO surface results in high interfacial impedance when in contact with Li metal. Typical solid-state battery cell fabrication techniques only perform partial removal of such contaminant reaction layers. Embodiments of the methods of the disclosure advantageously facilitate significant reduction of the surface contaminant reaction layers of a solid electrolyte through both removal of contaminants on the electrolyte surfaces, and prevention of further contamination of the electrolyte surfaces. The methods described can provide for fabrication of extended-cycling performance cells engineered with an interface design strategy approach. In contrast to other methods of fabricating solid-state battery cells that employ sputtering of lithium onto metals, the methods described herein employ a deposition of materials onto an oxide. Further, embodiments of the methods of the disclosure leverage the combination of vacuum annealing of LLZO, and vacuum deposition of Li metal to realize significant improvements in electrochemical performance, and to achieve high current density cell cycling (in some cases around 4 mA cm$^{-2}$) at room temperature (from 66 to 74° F.).

FIG. 1 illustrates an embodiment of a solid-state battery cell 100 architecture including a first electrode being an anode 104, a second electrode being a cathode 108, and an electrolyte 110 disposed between the anode 104 and the cathode 108. In embodiments, the first electrode may be a cathode and the second electrode may be an anode as desired for fabricating a solid-state battery cell. Whereas older battery technologies use a liquid electrolyte, solid-state batteries employ a solid as the electrolyte 110 between the anode 104 and the cathode 108. As compared to conventional liquid electrolytes, solid electrolytes allow for greater energy densities and faster charging and discharging of the battery cell, are cheaper to fabricate, and are less prone to explosion. The solid-state battery cell 100 of FIG. 1 also includes a first electrical lead 112a physically coupled to, and in electrical communication with, the anode 104, and a second electrical lead 112b physically coupled to, and in electrical communication with, the cathode 108. The electrical leads 112a and 112b are further electrically coupled to a resistive load 114. The resistive load 114 may be any electrical load that transforms the flow of electric current into energy to be used or stored. For example, the resistive load 114 may be a cellular device, a heater, a laptop computer, a lamp, an electric motor, or any other device that uses the energy provided by the solid-state battery 100 illustrated in FIG. 1.

Figure 2:
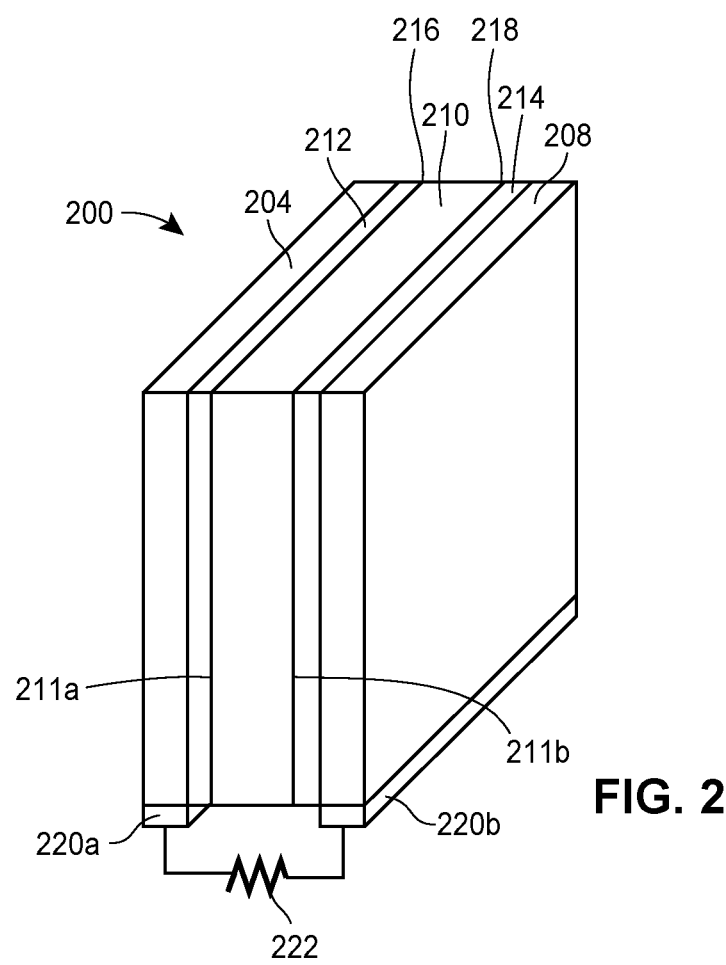
FIG. 2 illustrates an embodiment of a high-current-density, solid-state (HCDSS) battery cell fabricated according to the inter-facial design strategies described herein.

FIG. 2 illustrates an embodiment of a high-current-density, solid-state (HCDSS) battery cell 200 fabricated according to the inter-facial design strategies described herein. The HCDSS battery cell 200 includes an anode 204, a cathode 208, and a solid electrolyte 210 with a first surface 211a and a second surface 211b, with the solid electrolyte 210 disposed between the anode 204 and the cathode 208. A first deposition layer 212 between the anode 204 and the solid electrolyte 210, and a second deposition layer 214 between the cathode 208 and the solid electrolyte 210, cooperate with the electrolyte 210 to form first and second interfacial layers 216 and 218, respectively, at the interface boundaries between the first and second deposition layers 212 and 214 and the electrolyte 210. Due to the low concentration, or absence, of $H_2O$, $CO_2$, and other contaminants, an oxygen deficient interface (ODI) is formed during the deposition on the cleaned first and second surfaces 211a and 211b of the solid electrolyte 210. The ODI is the result of reduction of $Zr^{4+}$ species at the surface of LLZO by the deposited materials (e.g., lithium metal). Zr reduction could be derived from Li+ insertion as defined by the electroneutrality equation (i.e. a decrease in oxygen vacancy concentration); however, it is more likely that the highly oxyphilic Li metal drives the reduction of the LLZO surface, forming an ODI layer that is charge compensated by $Zr^{4+}$ reduction. The deposition of the first and second deposition layers 212 and 214 may be performed in any environment with reduced contaminants (e.g., $CO_2$, $H_2O$, etc.) to ensure oxygen-deficiency at the first and second interfacial layers 216 and 218.

In embodiments, the deposition layers 212 and 214 may be deposited onto the solid electrolyte 210 in a vacuum, which may prevent significant contamination at the interfacial layers 216 and 218. The deposition layers 212 and 214 may be deposited onto the solid electrolyte 210 by atomic layer deposition, chemical vapor deposition, molecular layer deposition, molecular beam epitaxy, sputtering, plating, a chemical deposition, a physical deposition, or by another deposition technique.

In embodiments, the first and second deposition layers 212 and 214 can include one or more of lithium, sodium, potassium, alloys of alkali metals (e.g., a tin-lithium alloy, a copper-tin-lithium alloy, etc.), an alkaline-earth-metal, their alloys with other metals, or another conductive materials. The first and second deposition layers can be the same material, or can be different materials.

In embodiments, the thickness of each of the first and second deposition layers may independently be between about 0.1 and about 1 nm, about 1 to about 10 nm, about 10 to about 100 nm, about 100 nm to about 1 μm, about 1 to about 10 μm, about 10 μm to 50 μm, about 20 μm to 50 μm, about 50 μm to 100 μm, or greater than 100 μm. Additionally, the thickness of each of the first and second deposition layers may be about 0.1 μm, about 0.5 μm, about 1 μm, about 5 μm, about 10 μm, about 15 μm, about 20 μm, about 50 μm, or about 100 μm.

Additionally, as discussed further below, the methods described herein may include performing cleaning and decontamination processes on the solid electrolyte 210 to ensure a degree of purity (i.e., lack of contamination by oxygen-based contaminants such as carbonates, hydroxyls, and zirconia materials) of the solid electrolyte 210 surfaces before deposition of the first and second deposition layers 214 and 216, to further prevent significant contamination at the interfacial layers 216 and 218.

Like the battery cell 100 depicted in FIG. 1, the HCDSS battery cell 200 includes a first electrical lead 220a physically and electrically coupled to the anode 204, and a second electrical lead 220b physically and electrically coupled to the cathode 208. The electrical leads 220a and 220b are further in electrical communication with a resistive load 222. The resistive load 222 may be any electrical load that transforms the flow of electric current into energy to be used or stored. For example, the resistive load 114 may be a cellular device, a heater, a laptop, or any other device which uses the energy provided by the HCDSS battery cell 200. In embodiments, the first and second electrical leads 220a and 220b may be part of (or the same as) the anode 204 and cathode 208, respectively. Therefore, the anode 204 and the cathode 208 may be in direct electrical communication with the resistive load 222 without any additional layers or structures physically coupled to the anode 204 and the cathode 208. Alternatively, the anode 204 and the cathode 208 may be in indirect electrical communication with the resistive load 222 having additional layers or structures physically coupled to the anode 204 and the cathode 208, the additional layers being independently between the resistive load 222 and the anode 204, and the resistive load 222 and the cathode 208.

In embodiments, the anode 204 and the cathode 208 can be or can include one or more of lithium, sodium, potassium, an alkaline-earth metal, nickel, cobalt oxide, lithium cobalt oxide, nickel lithium, aluminum oxide, nickel manganese cobalt, lithium nickel cobalt manganese oxide, lithium iron phosphate, lithium nickel cobalt aluminum oxide, lithium nickel manganese, cobalt aluminum oxide, lithium nickel manganese oxide, lithium manganese oxide, an alkaline-earth metal, alloys of alkali metals (e.g., a tin-lithium alloy, a copper-tin-lithium alloy, etc.) or another electrically conductive material. The anode 204 and the cathode 208 may be substrates physically coupled to the deposition layers 212 and 214 to allow for electrical communication between the anode 204 and the first deposition layer 212, and electrical communication between the cathode 208 and the second deposition layer 214. In embodiments, the anode 204 and the cathode 208 may be physically and electrically coupled, respectively, to the first and second deposition layers 212 and 214.

While the solid electrolyte is often described herein as being LLZO, it is envisioned that other materials may be used for the solid electrolyte. For example, $Li_{0.33}La_{0.55}TiO_3$ (LLTO) can be used as the solid electrolyte for fabricating HCDSS battery cells. Other examples of suitable solid electrolytes 210 include, but are not limited to, sulfide electrolytes, polymeric electrolytes, a glass, LLZO, doped LLZO, doped LLTO, a lithium ion-conducting solid, an ion conducting solid, or another solid electrolyte material. In embodiments, the solid electrolyte 210 may include any doped or undoped material having conductivities in the range of about $0.1 \times 10^{-3}$ to $1 \times 10^{-3}$ siemens per centimeter (S/cm), $1 \times 10^{-3}$ to $10 \times 10^{-3}$ S/cm, or $10 \times 10^{-3}$ to $10 \times 10^{-2}$ S/cm. Additionally, in embodiments, the solid electrolyte may include nanoscale cubic LLZO.

In embodiments, the electrolyte 210 may be doped. For example, the electrolyte can be doped with one or more of aluminum, tantalum, niobium, and other known dopants in concentrations to achieve desired properties at the interfacial layers 216 and 218. For example, the doped electrolyte can be a doped LLZO, which is doped with one or more of aluminum, tantalum, and niobium. The dopant may be selected to lower the occurrence of certain reactions at the interfacial layers 216 and 218 which may assist in reducing the amount of contaminants at the interfacial layers 216 and 218. The type of dopant may result in different thicknesses and continuities of a resultant ODI layer at the surfaces of the electrolyte. For example, it has been observed that aluminum doped LLZO allows for the generation of more continuous ODI layers compared to niobium doped LLZO, and deeper, or thicker, ODI layers than tantalum. For conventional electrolytes, any dopant that stabilizes the cubic phase LLZO which improves the ionic conductivity of the LLZO doped electrolyte may be desirable.

The dopant may assist in ensuring that the interfacial layers 216 and 218 are oxygen-deficient interface layers that allow for high-current-density cycling of the solid-state battery 200 as described herein. Various dopant materials and dopant concentrations may be preferred in various embodiments, For example, a certain dopant material may allow for the generation of thicker ODI layers, while other dopants may provide higher electrolyte conductivities. The dopant materials and concentrations may be determined by the desired ODI layer characteristics and the desired conductivities for a given battery cell.

The anode 204, cathode, 208, electrolyte 210, deposition layers 212 and 214, and any dopants may be selected such that the solid-state battery 200 is a solid-state battery cell capable of the current densities, and cycling cycles described herein. FIG. 2 illustrates an example of a solid state battery cell.

In embodiments, the interfacial layers 216 and 218 may independently have surface compositions of less than 20 at % of an impurity, less than 10 at % of an impurity, less than 5 at % of an impurity, or less than 1 at % of an impurity. In embodiments, each of the interfacial layers may have a same percentage of impurities, or may independently have different values of surface composition impurities. The reported percentages are atomic percentages of the solid electrolyte material within 5 to 10 nm of the surfaces of the solid electrolyte 210 as measured by XPS. In embodiments, the impurity or contaminant may be one or more of hydroxides, carbonates, zirconia materials, reactive oxygen species, and another contaminants. In embodiments, the interfacial layers 216 and 218 may have a surface composition with more than one impurity, such as, for example, an LLZO solid electrolyte with surface concentrations of both carbonate and hydroxide. In embodiments the purity of the surfaces of the electrolyte 210 may have more than 90 at % of the material makeup of the electrolyte, more than 95 at % of the material makeup of the electrolyte, or greater than 99 at % of the material makeup of the electrolyte.

In embodiments, the battery cells of the disclosure can operate at current densities of between 2 mA/cm$^2$ and 4 mA/cm$^2$ for more than 200 electrical cycles without degradation of the electrochemical performance of the HCDSS battery cell 200. In some embodiments, the battery cells of the disclosure can operate at current densities of between 2 mA/cm$^2$ and 4 mA/cm$^2$ for more than 300 electrical cycles without degradation of the electrochemical performance of the HCDSS battery cell 200. In embodiments, the battery cells of the disclosure can exhibit an overpotential value of 18±4 mV, or 20±4 mV.

In a specific embodiment of the HCDSS battery cell 200, the anode 204 and the cathode 208 are lithium foil, the solid electrolyte 210 is LLZO, and the first and second deposition layers 212 and 214 are lithium deposited on the electrolyte 210. In such an embodiment, the interfacial layers 216 and 218 may be oxygen-deficient interfacial layers. Such battery cells of the disclosure can advantageously have high-current-density cycling (e.g., greater than 4 mA/cm$^2$) for over 300 cycles without electrochemical degradation of the solid-state battery cell. In such an embodiment, the LLZO may be doped with aluminum, tantalum, niobium, or another dopant, which can further aid in achieving stable high-current-density cycling over hundreds of cycles.

Figure 3:
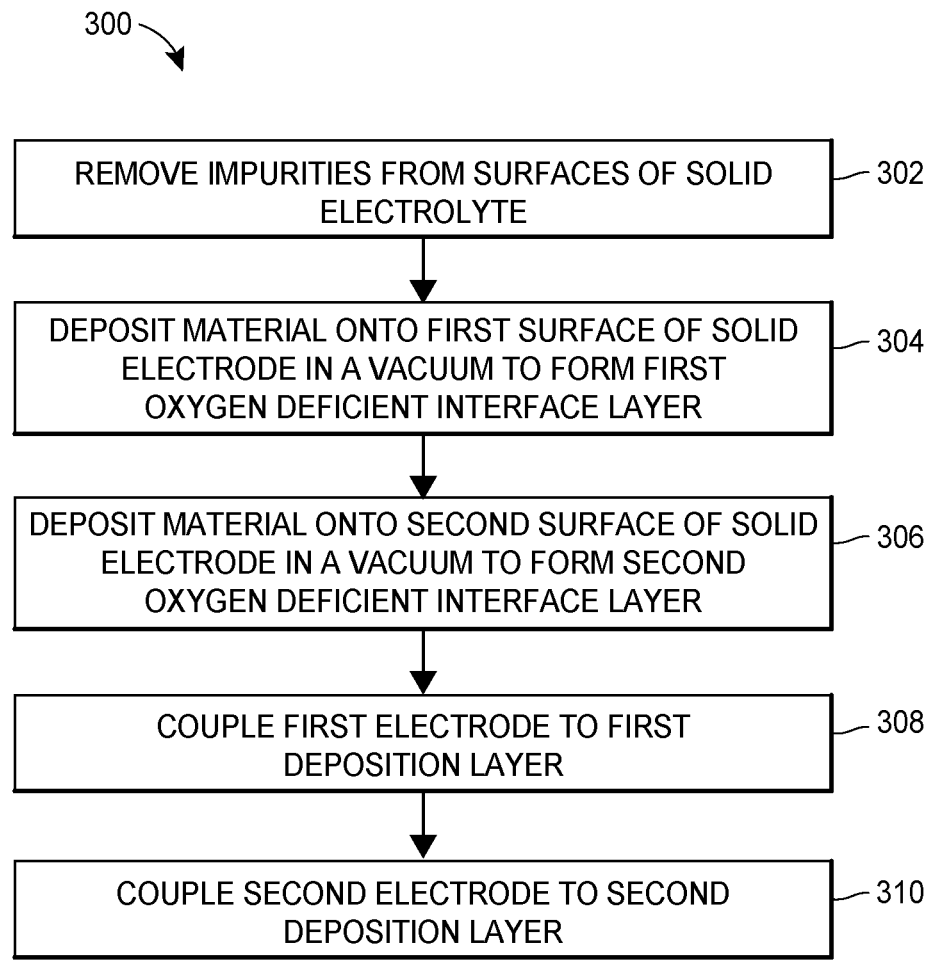
FIG. 3 is a flow diagram of an example method for fabricating HCDSS battery cells, such as the HCDSS battery cell of FIG. 2.

FIG. 3 is a flow diagram of an example method 300 for fabricating HCDSS battery cells, such as the HCDSS battery cell 200 of FIG. 2. The method 300 includes removing impurities from the first surface 211a and the second surface 211b of the solid electrolyte 210 (block 302). Various techniques known for removing impurities can be employed in the methods of the disclosure.

In embodiments, removing the impurities may include sanding and/or polishing the first and second surfaces 211a and 211b of the solid electrolyte 210 to remove any contaminants from the first and second surfaces 211a and 211b of the solid electrolyte 210. The sanding may be performed in a single stage or in multiple stages. For example, it may be desirable to sand the first and second surfaces 211a and 211b with a coarse sanding surface that has a lower grit value before sanding the first and second surfaces 211a and 211b with a finer sanding surface that has a higher grit value. This may allow for the removal of more impurities and contaminants from the first and second surfaces 211a and 211b than could be accomplished by performing a single pass sanding using a single grit value sanding surface alone.

In embodiments, removing the impurities may include removing hydroxide, carbonate, an oxide, a reactive oxygen species, another impurity or contaminant, or a combination thereof. In embodiments, removing the impurities may include purifying the first and second surfaces 211a and 211b to have a surface composition of less than 20 at % of the impurity, less than 10 at % of the impurity, less than 5 at % of the impurity, or less than 1% of the impurity. In embodiments, the sanding or mechanical polishing of the first and second surfaces 211a and 211b of the electrolyte 210 may be performed in any environment, such as a semi-clean environment, such as in a glove box, as long as a desired level of surface composition purity is achieved.

Removing impurities from the first and second surfaces 211a and 211b of the solid electrolyte 210 may also (additionally or alternatively) include heating the solid electrolyte 210 in a vacuum or a similarly $CO_2$ and $H_2O$ deficient environment. The solid electrolyte 210 may be heated to a temperature between 400° C. and 500° C., 300° C. and 600° C., 100° C. and 400° C., 400° C. and 500° C., or to greater than 600° C. In embodiments, the solid electrolyte 210 may be heated to any material-dependent temperature that is high enough to remove impurities from first and second surfaces 211a and 211b of the solid electrolyte 210, and low enough to avoid causing any molecular changes, changes in the crystal structure, warping, or damage to the structure of the solid electrolyte 210.

In embodiments, the heating, or annealing, may be performed by slowly increasing the temperature of the solid electrolyte 210, maintaining a peak temperature of the solid electrolyte 210, and slowly ramping down of the temperature of the solid electrolyte 210. For example, in embodiments employing LLZO as the solid electrolyte 210, the temperature may be increased over a five-hour period to heat the solid electrolyte 210 to a temperature of 500° C. The solid electrolyte 210 may be maintained at 500° C. for between thirty minutes and one hour, and then the solid electrolyte 210 may be cooled overnight. In embodiments, the solid electrolyte 210 may be heated or cooled faster or slower, and the peak temperature may be maintained for longer or shorter periods of time, dependent on the desired level of purity of the surfaces of the solid electrolyte 210, and the material properties of the solid electrolyte 210.

In embodiments, removing the impurities from the surfaces of the solid electrolyte (block 302) may include heating of the solid electrolyte 210, without sanding or mechanical polishing of the solid electrolyte 210. In other embodiments, removing the impurities from the surfaces of the solid electrolyte (block 302) may include sanding or mechanical polishing of the solid electrolyte 210, without heating or annealing of the solid electrolyte 210. In embodiments, removing impurities from the surfaces of the solid electrolyte can include both heating and sanding or mechanical polishing in any desired order. In other embodiments, one or more other forms of removing impurities from the surfaces of the solid electrolyte may be performed such as chemical baths, mechanical scrubbing, metallic ion removal, an etching, laser ablation, or other cleaning methods may be performed independently, concurrently, or successively to achieve a desired level or purity of the surfaces of the solid electrolyte.

The method 300 further includes depositing a first material onto the first surface 211a of the solid electrolyte 210 (block 304). Deposition of the first material on the first surface 211a to form the first deposition layer 212 on the first surface 211a of the solid electrolyte 210. Deposition of the first material on the first surface 211a of the solid electrolyte 210 may be performed by atomic layer deposition, chemical vapor deposition, molecular layer deposition, molecular beam epitaxy, sputtering, plating, a chemical deposition, a physical deposition, or by another deposition technique. The deposition of the first material may be performed in a vacuum with a pressure from 760 to 25 Torr, 25 to $10^{-3}$ Torr, $10^{-3}$ to $10^{-9}$ Torr, $10^{-9}$ to $10^{-12}$ Torr, less than $10^{-9}$ Torr, or any vacuum, or oxygen-depleted environment with a reduced water vapor partial pressure, and reduced $CO_2$ content, sufficient to prevent the formation of significant impurities on the first surface 211a of the solid electrolyte 210. The amount of impurities that may be considered "significant" may depend on the specific materials and dopants involved, but, in any embodiment, the amount of impurities on the surfaces of the electrolyte must be low enough to allow for the stable high-current-density cycling as described herein. Additionally, the deposition of the first material on the first surface 211a of the solid electrolyte 210 is performed in a vacuum sufficient enough to allow for the generation of the first oxygen-deficient interface layer 216 at the interface of the first deposition layer 212 and the first surface 211a of the solid electrolyte.

The oxygen deficient interface layer 216 is formed during the deposition of the first material onto the cleaned first surface 211a. The oxygen deficient interface layer 216 is formed by the deposition of the first deposition layer 212 causing the reduction of species at the first surface 211a. For LLZO electrolytes, the reduction may be derived from $Li^+$ insertion as defined by the electroneutrality equation (i.e. a decrease in oxygen vacancy concentration). Additionally, for LLZO electrolytes, the highly oxyphillic Li metal drives the further reduction of the first surface 211a forming an oxygen deficient interface layer that is charge compensated by $Zr^{4+}$ reduction.

In embodiments, the material deposited on the first surface 211a of the solid electrolyte 210 may be lithium, sodium, potassium, an alkaline-earth metal, or another conductive material. In embodiments, the thickness of the first deposition layer 212 may be between 0.1 and 1 nm, 1 to 10 nm, 10 to 100 nm, 100 nm to 1 µm, 1 to 10 µm, or greater than 10 µm.

Previous battery cell fabrication methods have avoided deposition of materials in vacuums, or low contaminant environments due to cost concerns and potential problems with scalability for mass production.

After deposition of the first material on the first surface 211a of the solid electrolyte 210, the method 300 further includes depositing a second material onto the second surface 211b of the solid electrolyte 210 (block 306). Deposition of the second material on the second surface 211b forms the second deposition layer 214 on the second surface 211b of the solid electrolyte 210. Deposition of the second material on the second surface 211b of the solid electrolyte 210 may be performed by atomic layer deposition, chemical vapor deposition, molecular layer deposition, molecular beam epitaxy, sputtering, plating, a chemical deposition, a physical deposition, or by another deposition technique. The deposition of the second material may be performed in a vacuum with a pressure from 760 to 25 Torr, 25 to $10^{-3}$ Torr, $10^{-3}$ to $10^{-9}$ Torr, $10^{-9}$ to $10^{-12}$ Torr, less than $10^{-9}$ Torr, or any vacuum or oxygen-depleted environment sufficient to prevent the formation of significant impurities on the second surface 211b of the solid electrolyte 210. The amount of impurities on the second surface 211b of the solid electrolyte 210 must be low enough to allow for the stable high-current-density cycling as described herein. Additionally, the deposition of the second material on the second surface 211b of the solid electrolyte 210 is performed in a vacuum sufficient enough to allow for the generation of the second oxygen-deficient interface layer 218 at the interface of the second deposition layer 214 and the second surface 211b of the solid electrolyte 210. In embodiments, the material deposited on the second surface of the solid electrolyte may be lithium, sodium, potassium, an alkaline-earth metal, or another conductive material. The second material may be the same material as the first material deposited on the first surface 211a of the solid electrolyte 210, or the second material may be a different material than the first material deposited on the first surface 211a of the solid electrolyte 210. In embodiments, the thickness of the second deposition layer 214 may be between 0.1 and 1 nm, 1 to 10 nm, 10 to 100 nm, 100 nm to 1 µm, 1 to 10 µm, or greater than 10 µm.

In embodiments, the deposition of the first deposition layer 212 and the second deposition layer 214 may be performed by any deposition technique that deposits material onto the first and second surfaces 211a and 211b of the solid electrolyte 210 with an energy great enough to cause reactivity at the first and second surfaces 211a and 211b of the solid electrolyte 210. For example, electron beam deposition may deposit materials onto the first and second surfaces 211a and 211b of the solid electrolyte 210 at energies too low to cause reactivity of the materials of the first and second surfaces 211a and 211b of the solid electrolyte 210. Radio-frequency (RF) radiation may then be provided to the deposited materials in a low pressure background of argon or other gases, yielding charged species that can energize the materials to cause reactions of the deposited materials with the solid electrolyte 210. For example, in embodiments, the background pressure may approximately be $2.5\times10^{-2}$ mbar, between $1\times10^{-2}$ and $1\times10^{-3}$ mbar, or between $1\times10^{-1}$ and $1\times10^{-2}$ mbar. In a specific example, electron beam deposition may deposit lithium onto surfaces of an LLZO electrolyte. RF argon sputtering may then provide additional energy to the deposited lithium causing the lithium to react with the LLZO electrolyte, resulting in the reduction of the zirconium and forming an ODI layer at the interface of the deposited lithium and the surfaces of the LLZO electrolyte. Energy may be provided to a deposition layer by other means such as direct current (DC) argon (or other noble and non-noble gases) ion bombardment or implantation, ultraviolet irradiation, using focused ion and/or electron beams, or using the energy of ions present intrinsically during magnetron sputtering of lithium metal.

In embodiments of the method 300 of the disclosure, the solid electrolyte 210 (including the first deposition layer 212) may be moved from the vacuum to a glove box or other environment that allows for the solid electrolyte 210 to be physically moved, reoriented, or flipped over after the deposition of the first material on the first surface 211a of the solid electrolyte 210. The moving or flipping of the solid electrolyte 210 allows access to the second surface 211b for deposition of the second material onto the second surface 211b of the solid electrolyte 210.

In embodiments of the method 300 that include moving the solid electrolyte 210 to a glove box or other environment, the second surface 211b may be exposed to certain impurities, which may be acceptable as long as the amount of impurities on the second surface 211b allows for the deposition of the second material onto the second surface 211b such that the battery cell is able to perform at the electric cycling performance standards as described herein. For example, in an embodiment with LLZO as the solid electrolyte 210, and aluminum as the first and second materials deposited on the first and second surfaces 211a and 211b of the solid electrolyte 210 the battery cell can still perform according to the cycling performance standards described herein, with 11 at % of carbonate and 16 at % of hydroxide surface concentrations of impurities. Embodiments that employs LLZO as the solid electrolyte 210 may have surface concentrations of between 30 at % and 50 at % of carbonate, between 20 and 30 at % of carbonate, between 10 at % and 20 at % of carbonate, between 5 at % and 10 at % of carbonate, less than 5 at % of carbonate, or an immeasurable amount of carbonate. Additionally, or alternatively, an LLZO solid electrolyte may also have between 30 at % and 50 at % of hydroxide, between 20 and 30 at % of hydroxide, between 10 at % and 20 at % of hydroxide, between 5 at % and 10 at % of hydroxide, less than 5 at % of hydroxide, or an immeasurable amount of hydroxide. Other dopants and electrolyte materials may allow for higher concentrations of surface impurities, or may require lower concentrations of surface impurities for fabrication of a battery cell capable of performing at the current densities as described herein.

The method 300 further includes physically and electrically coupling the first electrode, such as the anode 204, to the first deposition layer 212 (block 308) and physically and electrically coupling a second electrode, such as the cathode 208, to the second deposition layer 214 (block 310). In embodiments, the anode 204 and cathode 208 may independently be lithium, sodium, potassium, an alkaline-earth metal, nickel, cobalt oxide, lithium cobalt oxide, nickel lithium, aluminum oxide, nickel manganese cobalt, lithium nickel cobalt manganese oxide, lithium iron phosphate, lithium nickel cobalt aluminum oxide, lithium nickel manganese, an alkaline-earth metal, or another electrically conductive material.

In a specific embodiment of the method 300 of FIG. 3, impurities are removed from the first and second surfaces 211a and 211b of the solid electrolyte 210 with the solid electrolyte 210 being an LLZO substrate (block 302). Lithium is deposited on both the first surface 211a of the LLZO substrate (block 304) and on the second surface 211b of the LLZO substrate (block 306). A sheet of lithium foil, acting as the first electrode (e.g., the anode 204), is then coupled to the first lithium deposition layer 212 (block 308), and a second sheet of lithium foil is physically coupled to the second lithium deposition layer 214 (block 310). In such an embodiment, the LLZO may be doped with aluminum, tantalum, niobium, or another dopant to allow for stable high-current-density cycling over hundreds of cycles as described herein.

Figure 4:
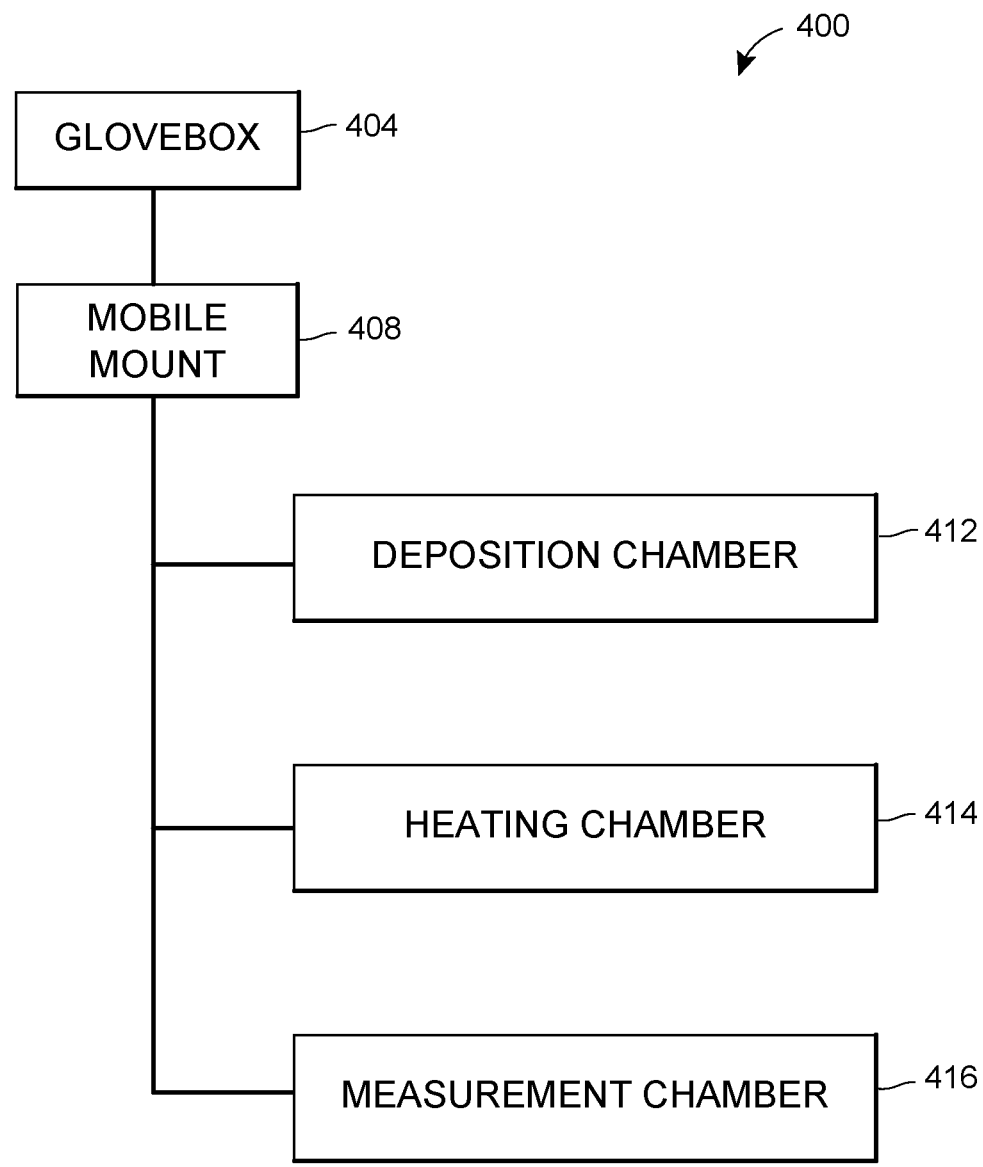
FIG. 4 is a block diagram of a system for fabricating HCDSS battery cells.

FIG. 4 is a block diagram of a system 400 for performing the method 300 of FIG. 3. A solid electrolyte 210 sample may be introduced to the system 400 by means of a glove box 404. The glove box 404 may be an environment that is oxygen deficient, a clean room, a clean environment, or an environment similar to a room environment outside of the glove box 404. Cleaning of the surfaces 216 and 218 of the solid electrolyte 210 may be performed in the glove box 404, and may include sanding, chemical baths, mechanical scrubbing, metallic ion removal, an etching, laser ablation, or other cleaning method. The solid electrolyte 210 may be affixed to a mobile mount 408 while in the glove box 404 and the mobile mount 408 may transport the solid electrolyte 210 from the glove box 404 to any of the other components shown in the system 400 of FIG. 4. The system 400 may include a deposition chamber 412, a heating chamber 414, and a measurement chamber 416, each accessible by the mobile mount 408. Additionally, the deposition chamber 412, heating chamber 414, measurement chamber 416, and any interconnecting pathways may all be in a vacuum, or $CO_2$-deficient and reduced water vapor partial pressure environment.

The mobile mount 408 may transport the solid electrolyte 210 to the heating chamber 414 and the heating chamber 414 may heat the solid electrolyte 210 to purify the surfaces 216 and 218 of the solid electrolyte 210 as described herein. The mobile mount 408 may transport the solid electrolyte 210 to the deposition chamber 412, and the deposition chamber 412 may deposit materials onto a surface 216 and 218 of the solid electrolyte 210. The deposition chamber 412 may be configured to perform atomic layer deposition, chemical vapor deposition, molecular layer deposition, molecular beam epitaxy, sputtering, plating, a chemical deposition, a physical deposition, or by another deposition technique.

The mobile mount 408 may transport the solid electrolyte 210 to the measurement chamber 416 to perform any number of measurements on the solid electrolyte 210 and on the surfaces 216 and 218 of the solid electrolyte 210. For example, the measurement chamber 416 may measure the impurities and/or concentration of impurities on the surfaces 216 and 218 of the solid electrolyte 210. The measurement chamber 416 may further perform composition measurements of the solid electrolyte 210, thickness measurements on the deposition layers 212 and 214 on the solid electrolyte 210, or another measurement for ensuring fabrication of a HCDSS battery cell as described herein. The measurement chamber 316 may be configured to perform X-ray photoelectron spectroscopy (XPS), x-ray absorption spectroscopy, ultraviolet photoelectron spectroscopy, local electrochemical impedance spectroscopy, near-ambient pressure x-ray photoelectron spectroscopy, high-resolution scanning electron microscopy, or another suitable or desired measurement.

The mobile mount 408 may transport the solid electrolyte 210 back to the glove box 404, in embodiments, to facilitate performance of various tasks. For example, the mobile mount 408 may transport the solid electrolyte 210 back to the glove box 404 from the deposition chamber 412, after the first deposition layer 212 is deposited, so that the solid electrolyte 210 may be flipped in order to deposit the second deposition layer 214 on the second surface 218 of the solid electrolyte 210.

In embodiments, the system 400 may have more components or fewer components as desired, and, additionally, some of the components illustrated in FIG. 4 may be a single component. For example, the heating chamber 414 and the deposition chamber 412 may be the same chamber, or the measurement chamber 416 and the heating chamber 414 may be the same chamber, or any other combination of chambers for performing operations for fabrication of HCDSS batteries as described herein.

EXAMPLES

In specific example doped LLZO electrolyte pellets were synthesized via solid state reaction. Other LLZO electrolyte synthesis methods are also applicable. First, the LLZO pellet was placed on a stainless steel sample holder and introduced to an $H_2O$ and $CO_2$ free environment. The LLZO pellets were polished in the $H_2O$ and $CO_2$ free atmosphere as described herein. The polished LLZO pellets were then UHV-annealed to remove any residual contaminants. Metallic Li film was vacuum deposited onto UHV-annealed LLZO to form an anode on the LLZO pellet. Thicker lithium films were deposited on the Li film, and an opposing side of the UHV-annealed LLZO pellet, to form a coin cell. The LLZO pellet was removed from the UHV environment and a clean Li foil was placed onto the Li film to prevent direct contact between the Li film and the stainless steel pellet holder after flipping the LLZO over to coat a second side of the LLZO pellet. Li metal was then deposited on the second side of the LLZO pellet. The LLZO pellet was transferred into a glove box and a clean Li foil was placed on the Li film on the second side of the LLZO pellet. The Li-LLZO-Li cell was then assembled into a coin cell inside the same glove box.

To determine the material makeup of the surfaces of the LLZO pellet, XPS measurements were performed on the surfaces of the LLZO pellet using a Specs PHOIBOS 150 hemispherical energy analyzer with a monochromated Al Kα X-ray source. Charge neutralization was carried out for insulating LLZO samples using a low-energy flood gun with 5 eV electron energy. The neutralization conditions were optimized on the basis of the degree of charging present for a given sample. Survey spectra were measured using a pass energy of 40 eV at a resolution of 0.2 eV per step and a total integration time of 0.1 s per point. Core-level spectra were measured using a pass energy of 20 eV at a resolution of 0.05 eV per step and a total integration time of 0.5 s per point. Deconvolution was performed using CasaXPS software with a Shirley-type background and 70-30 Gaussian-Lorentzian peak shapes. The resulting measurements provided atomic percentages of the elements at and/or near the surfaces of the LLZO pellet (5-10 nm from surface), as reported herein.

Figure 5:
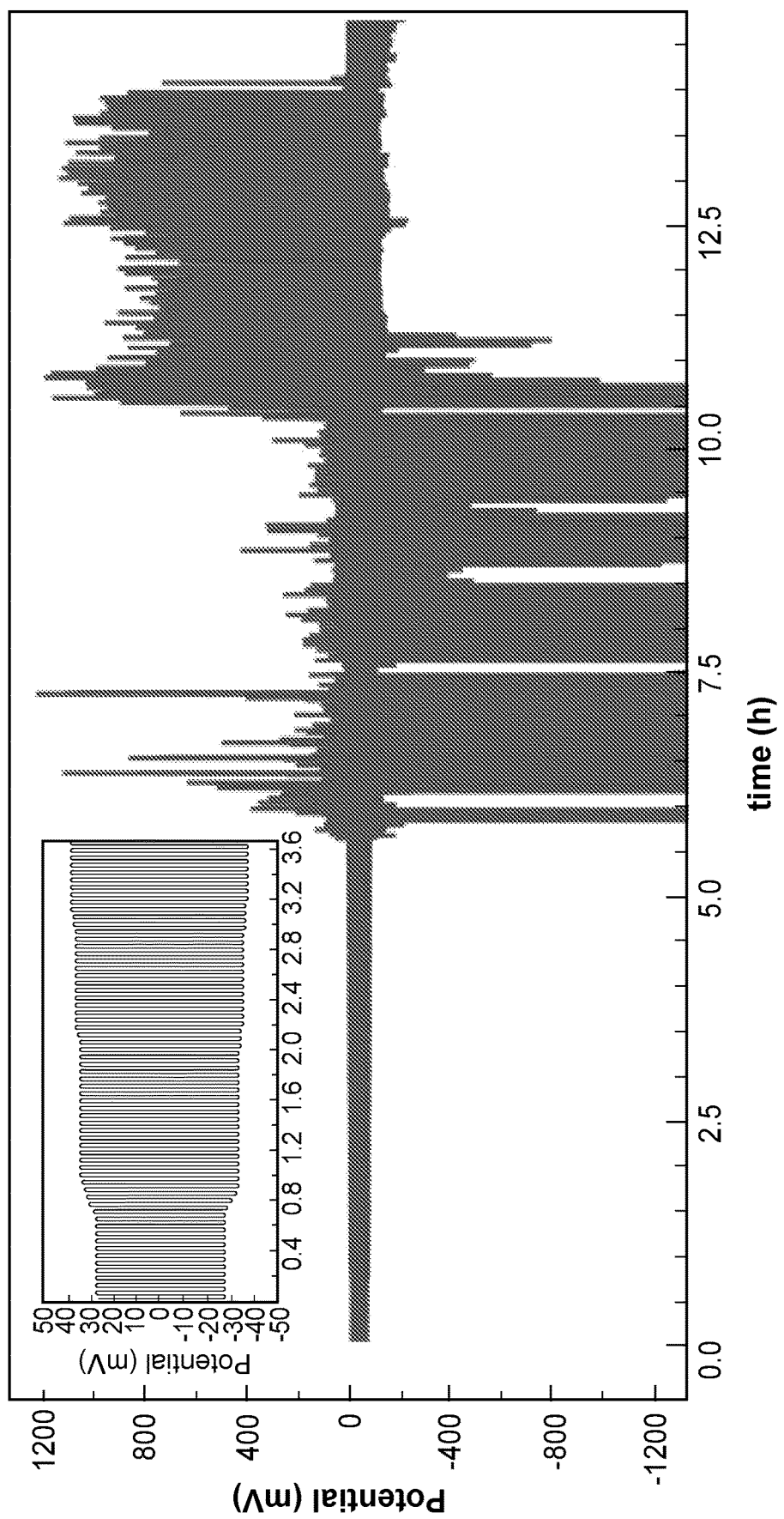
FIG. 5 is a plot of electrical cycling data showing electric overpotential vs. time for an aluminum doped LLZO battery cell with lithium electrodes that was purified using vacuum annealing, and fabricated without deposition layers and oxygen-deficient interfaces.

Turning now to FIG. 5, a plot of electrical cycling data shows electric overpotential vs. time for a conventional aluminum doped LLZO battery cell which was purified using vacuum annealing, and having lithium foil electrodes. The battery represented by the data in FIG. 5 was not fabricated with deposition layers or oxygen-deficient interfaces, as described herein. The data in FIG. 5 show cycling current densities of 2 mA $cm^{-2}$. The data also show that the battery cell failed after about six hours of cycling at 2 mA $cm^{-2}$, as indicated by the large voltage peaks in FIG. 5 starting between five and a half and six hours. The inset plot in FIG. 5 shows a zoomed-in segment of the cycling data. The inset of FIG. 5 shows that the cycling overpotential slowly increases over time during the cycling until the battery cell undergoes significant electrochemical degradation and the battery fails as seen around hour six in the plot of FIG. 5. Therefore, the data of FIG. 5 show that battery stability and long term cycling of the battery still fails without further fabrication considerations as described herein.

Figure 6:
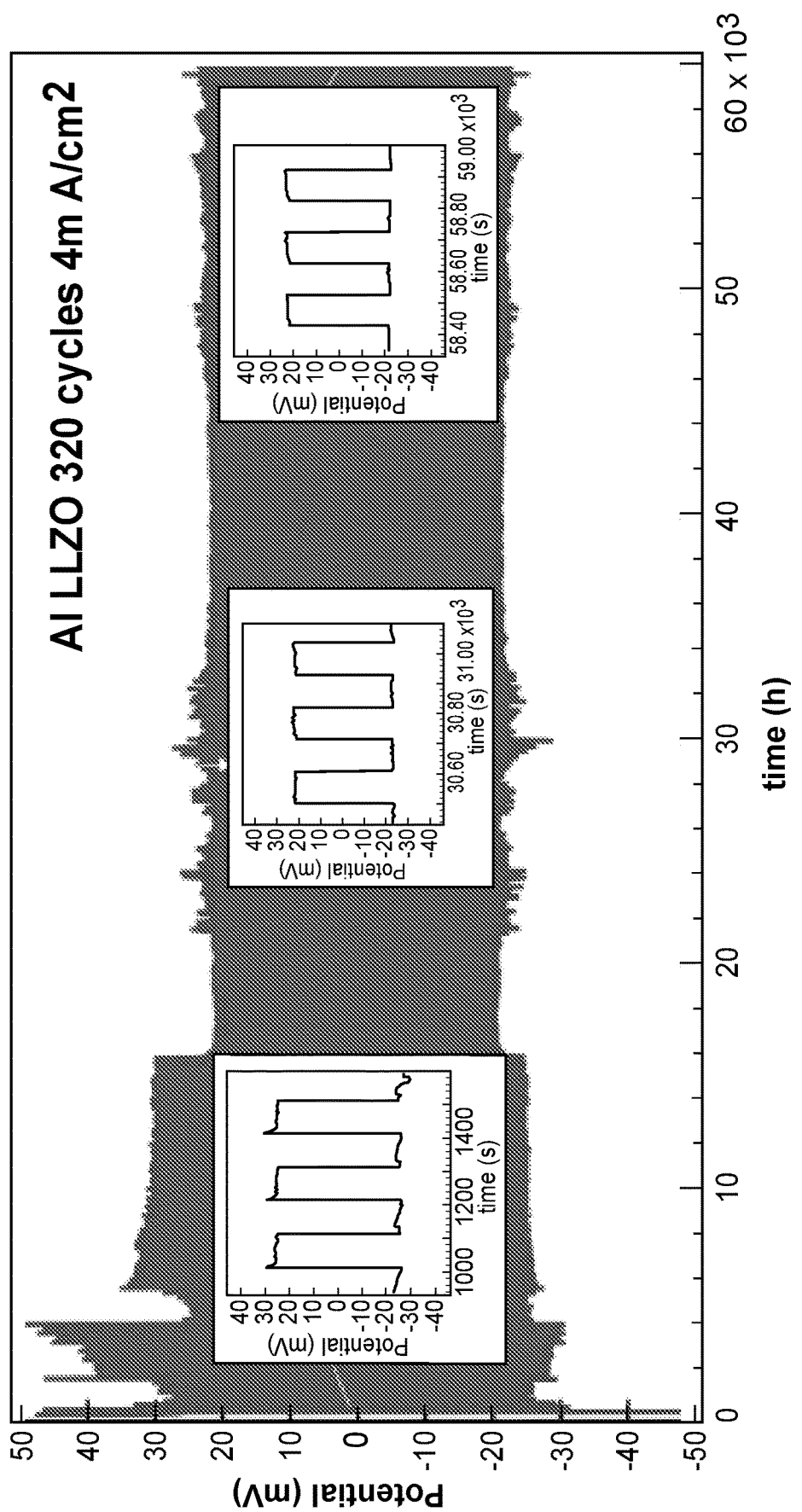
FIG. 6 is a plot of electrical cycling data showing electric overpotential vs. time for an aluminum doped LLZO battery cell that was purified using vacuum annealing and fabricated with deposition layers and oxygen-deficient interfaces.

FIG. 6 is a plot of electrical cycling data showing electric overpotential vs. time for an aluminum doped LLZO battery cell in accordance with the disclosure, which was purified using vacuum annealing and fabricated with a deposition layer of lithium thin films on two opposing surfaces of the Al-doped LLZO. Lithium foils were then placed in contact with each of the lithium thin film surfaces to provide a large excess of lithium metal for cycling. The data in FIG. 6 show that, over time, the overpotential decreases and appears to stabilize near 20 mV, instead of increasing over time as with the overpotential shown in FIG. 5. The insets of FIG. 6 show that the early cycling (left inset) exhibits overshoot and undershoot, while the later cycles (right inset) have reduced overshoot and undershoot, and exhibit an increase in the flatness of the cycle peaks. The data in FIG. 6 show that the Al-doped LLZO battery with purified surfaces and deposition and oxygen-deficient layers is capable of performing electric cycling at 4 mA/$cm^2$ for over 320 cycles, or over 16 hours. Although the cycling data in FIG. 6 is for an Al-doped LLZO battery cell, similar results were achieved with lithium doped LLZO battery cells, and it is envisioned other dopants may provide similar or improved cycling lifetimes and current densities.

Figure 7A:
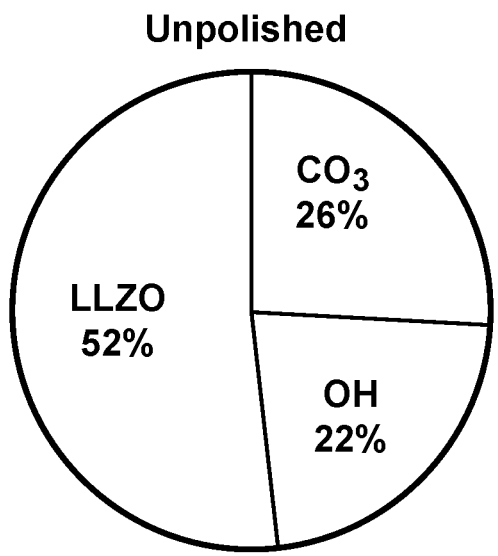
FIG. 7A is a pie chart showing the impurity levels of an unpurified LLZO surface.
Figure 7B:
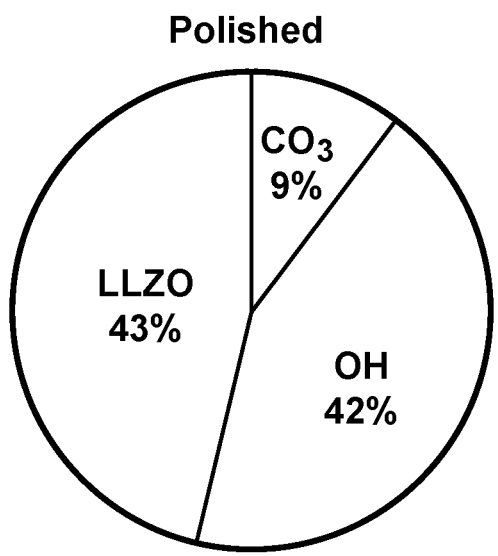
FIG. 7B is a pie chart showing the impurity levels of a mechanically polished LLZO surface.
Figure 7C:
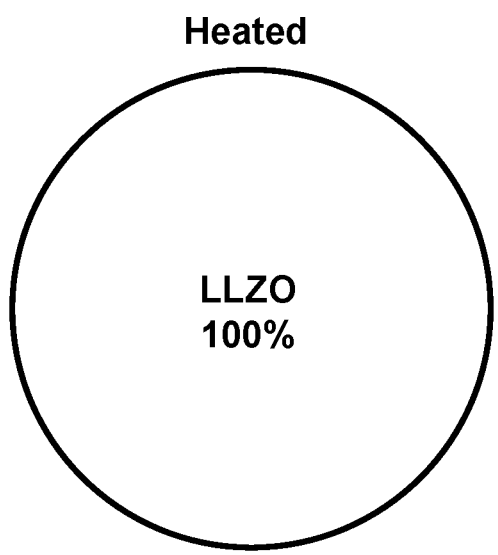
FIG. 7C is a pie chart showing the impurity levels of a mechanically polished, and vacuum annealed LLZO surface.

FIGS. 7A through 7C are pie charts showing impurity levels of an LLZO surface at different stages of cleaning. The surface content data shown in FIGS. 7A through 7C was taken by performing X-ray photoelectron spectroscopy measurements on the LLZO interfaces. FIG. 7A shows an unpurified LLZO surface with significant carbonate (26 at % $CO_3$) and hydroxide (22 at % OH) content. Much, but not all, of the carbonate content can be removed by mechanical polishing as described herein. FIG. 7B shows reduced carbonate content, down to 9 at %, and increased hydroxide content, up to 42 at %, after mechanical polishing (i.e., sanding) of the LLZO surface. Annealing, or heating, of the LLZO surface in an ultra-high vacuum (UHV) was performed to remove more of the carbonate and hydroxide content from the LLZO surface. FIG. 7C shows that any carbonate or hydroxide content at the LLZO surface is in unmeasurable trace amounts resulting in a measurement of 100% LLZO. The results of FIG. 7C are after the LLZO was heated in a UHV at 500° C.

When UHV-annealed LLZO substrates are removed from a vacuum or oxygen-deficient environment, such as a glove box, detectable levels of surface contaminants are present after 5 min of exposure, and after 3 hours, the surfaces of the LLZO return to impurity concentrations comparable to the surface compositions prior to polishing. Therefore, materials processed in glove box environments are likely to be oxidized and contaminated to some extent by residual $CO_2$ and $H_2O$. Due to the potential oxidation and contamination, UHV-annealing of the LLZO surfaces serves as a critical step in the interface design strategies described herein to realize carbonate- and hydroxide-free interfaces.

Figure 8A:
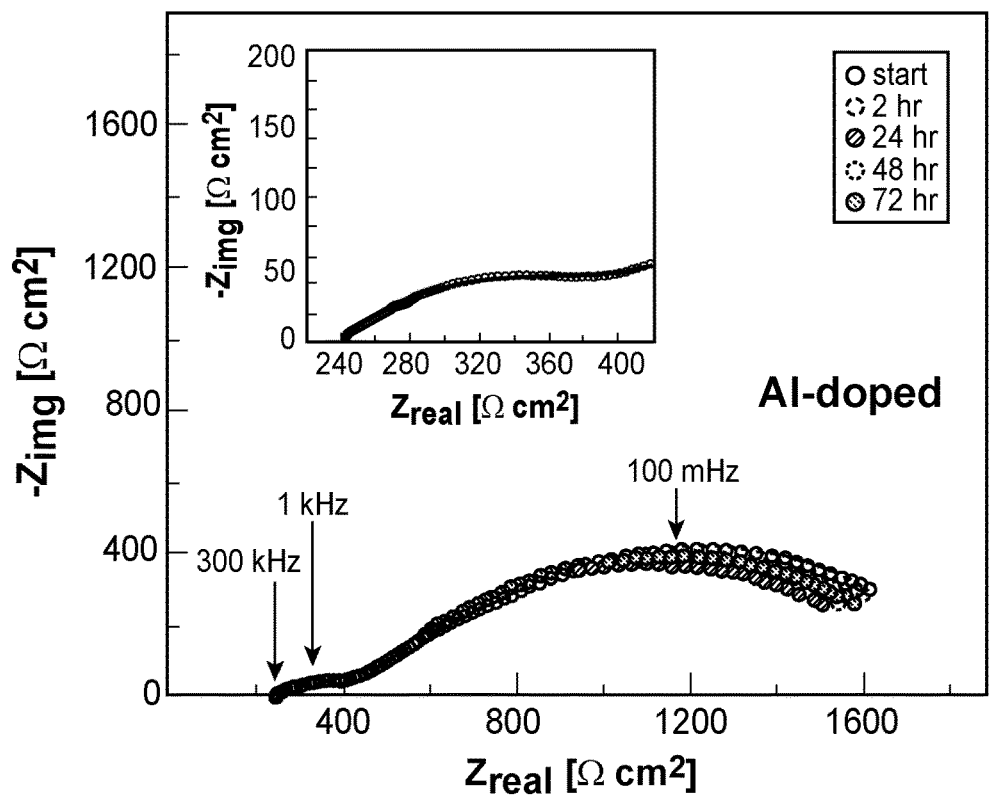
FIG. 8A is a plot of electrical impedance for different lengths of time for lithium-LLZO interfaces for aluminum doped LLZO.
Figure 8B:
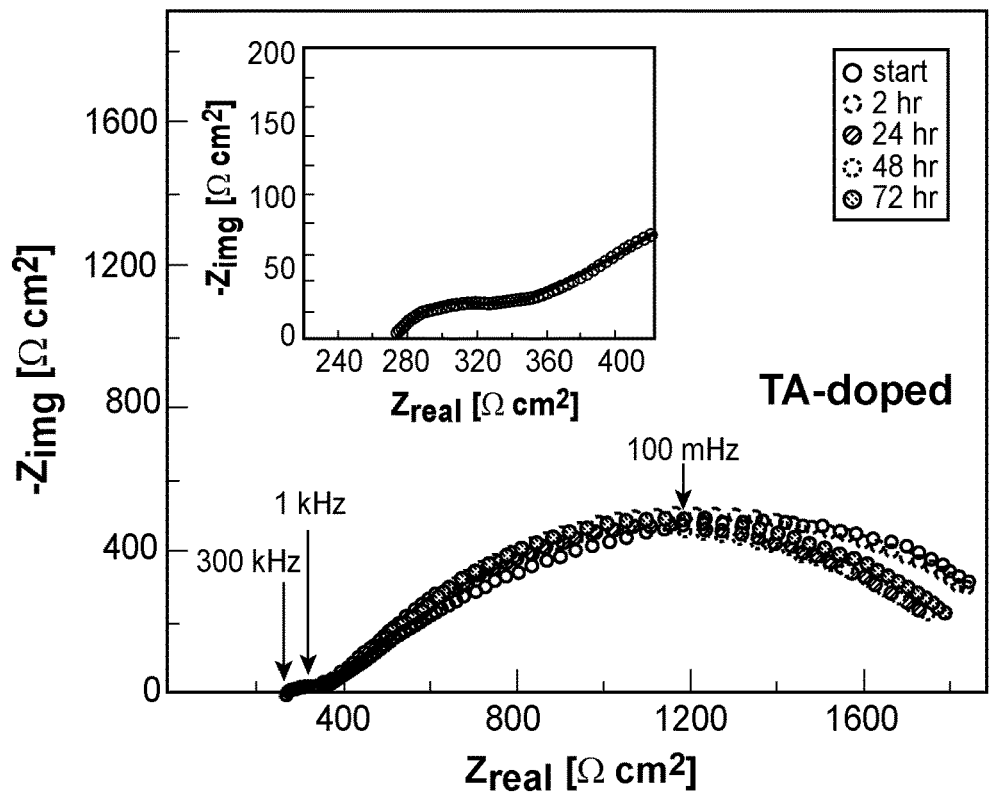
FIG. 8B is a plot of electrical impedance for different lengths of time for lithium-LLZO interfaces for tantalum doped LLZO.
Figure 8C:
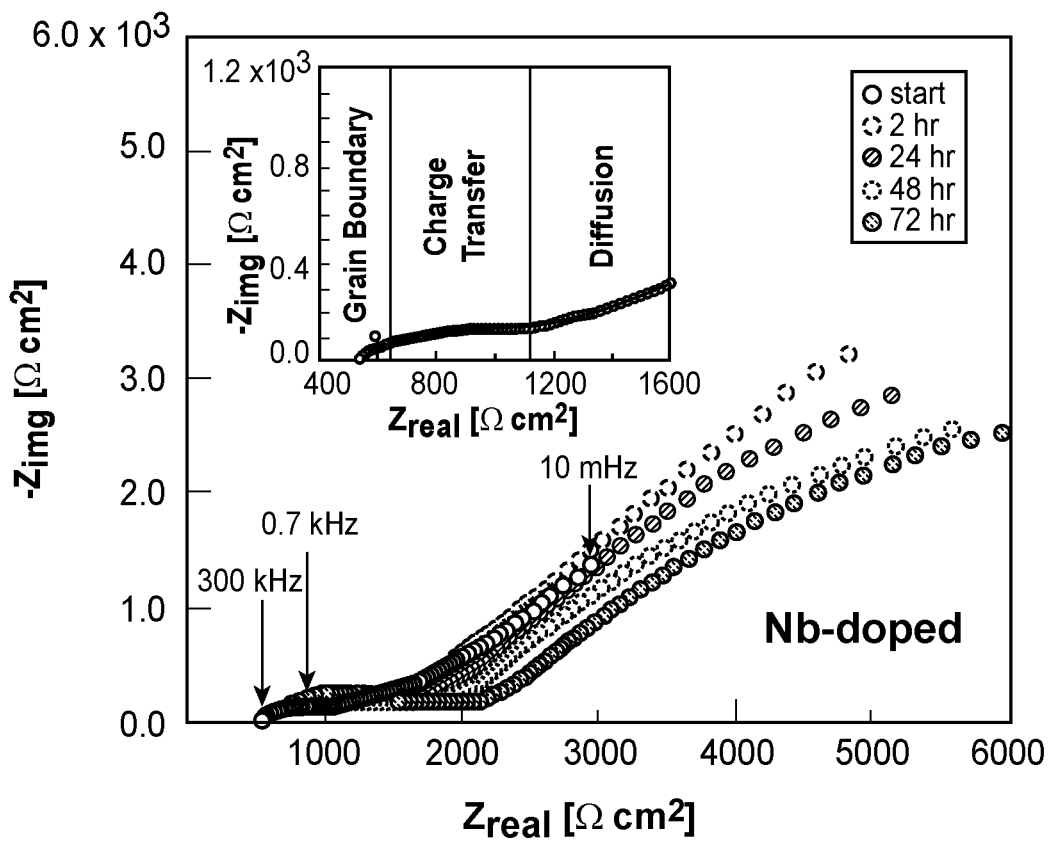
FIG. 8C is a plot of electrical impedance for different lengths of time for lithium-LLZO interfaces for niobium doped LLZO.

The stability of LLZO in contact with Li may vary dependent on dopant species in the LLZO and Li. Dopants in the LLZO may stabilize the cubic phase of the material and improve lithium ion conductivity, which can help engineer a desired interfacial reactivity. FIGS. 8A through 8C are plots of impedance stability for lithium-LLZO interfaces for aluminum doped LLZO, tantalum doped LLZO, and niobium doped LLZO, respectively. The inset plots on FIGS. 8A and 8B show that the initial charge transfer resistance values for both the aluminum and tantalum are comparable at about 50 $\Omega*cm^2$ and 25 $\Omega*cm^2$ respectively. For niobium, the initial resistance value is much higher, at 400 $\Omega*cm^2$. The measured resistance values are lower than typical lithium-LLZO interfaces due to the purity level of the LLZO surfaces at the lithium-LLZO interface, and the oxygen-deficient interface layer generated by the fabrication methods described herein.

FIGS. 8A and 8B show that over time, the aluminum- and tantalum-doped LLZO exhibit long-term impedance stability with only small changes to the charge transfer resistance values over a 72-hour period of time. Alternatively, FIG. 8C shows that the niobium doped LLZO increases over time, which may be due to a continued interaction between the lithium and the niobium doped LLZO. The plots of FIGS. 8A through 8C show that the selection of a particular dopant may be important in the fabrication of solid-state batteries according to the methods and systems described herein. While FIGS. 8A and 8C illustrate the dopant-dependent impedance stability of lithium-LLZO interfaces for three different dopants, it is envisioned that other dopants may also provide various desired levels of interfacial impedance stability for lithium-LLZO interfaces. Additionally, material dopants may also be used to control the impedance stability of solid-state battery cell interfaces of other materials such as lithium polymer interfaces, lithium-glass interfaces, sodium-glass interfaces, nickel-metal hydride interfaces, and other material interfaces.

FIG. 9 is a table of example impurity values of doped LLZO solid electrolytes after different cleaning processes. The table shows aluminum-doped LLZO in row A, niobium-doped LLZO in row B, and tantalum-doped LLZO in row C. The relative surface concentrations of the lithium-carbonate, lithium-hydroxide, and LLZO were measured using deconvoluted XPS measurement data and are reported in the various columns of FIG. 9. Sub-rows in each row report the surface concentrations of the three materials for unpolished LLZO, surface-polished LLZO, polished LLZO and further heating of the LLZO to 80° C., and polished LLZO and further heating of the LLZO to 500° C. The results presented in FIG. 9 show that polishing the LLZO decreases the carbonate content of the surfaces while increasing the hydroxide content of the surfaces. Heating the LLZO to 80° C. decreases the hydroxide content significantly and increases the carbonate content of the surfaces. Heating the LLZO to 500° C. shows significant decreases in both the carbonate and hydroxide content of the LLZO surfaces. In fact, FIG. 9 shows that for all three of the doped LLZO solid electrolytes, the carbonate content was reduced to an immeasurable amount after heating the LLZO to 500° C., and the LLZO content was increased to above 90 at % for each of the LLZO solid electrolytes. The data reported in FIG. 9 illustrate that a minimum heat threshold must be reached not only to remove the carbonate from the LLZO surface, but also to prevent further generation of carbonate due to the heating process. The minimum temperature for heating LLZO for purifying the surface content is expected to be in the range of hundreds of degrees Celsius, for example between 30° and 500° C. The temperature required for cleaning of a surface may depend on the solid electrolyte material and may therefore vary over wide ranges of temperatures. The cleaning temperature for a material must be high enough to remove impurities from the surfaces of the solid electrolyte, and simultaneously low enough to avoid causing any molecular changes, changes to the crystal structure, warping, or damage to the structure of the solid electrolyte.

The following list of aspects reflects a variety of the embodiments explicitly contemplated by the present disclosure. Those of ordinary skill in the art will readily appreciate that the aspects below are neither limiting of the embodiments disclosed herein, nor exhaustive of all of the embodiments conceivable from the disclosure above, but are instead meant to be exemplary in nature.

1. A solid-state battery cell, comprising: a first electrode having a first electrode first surface and an oppositely disposed first electrode second surface; a second electrode having a second electrode first surface and an oppositely disposed second electrode second surface; a solid electrolyte extending between the first and second electrodes, the solid electrolyte having oppositely disposed first and second electrolyte surfaces, wherein the first electrolyte surface is in facing relation to the first electrode second surface and the second electrolyte surface is in facing relation to the second electrode first surface; a first oxygen-deficient interface layer disposed between the first electrolyte surface and the first electrode second surface; and a second oxygen-deficient interface layer disposed between the second electrolyte surface and the second electrode first surface.
2. The solid-state battery cell of aspect 1, wherein the first electrode comprises one or more of lithium, sodium, potassium, an alkaline-earth metal, or alloys thereof.
3. The solid-state battery cell of either aspect 1 or aspect 2, wherein the second electrode comprises one or more of lithium nickel manganese cobalt oxide, lithium nickel manganese oxide, lithium nickel cobalt aluminum oxide, or lithium iron phosphate.
4. The solid-state battery cell of any of aspects 1 to 3, wherein the electrolyte comprises one or more of sulfide, polymeric electrolyte, glass, lithium lanthanum zirconium oxide (LLZO), and a ion conducting solid.
5. The solid-state battery cell of any of aspects 1 to 4, wherein the electrolyte is doped with a dopant.
6. The solid-state battery cell of aspect 5, wherein the dopant is one or more of aluminum, tantalum, and niobium.
7. The solid-state battery cell of aspect 5, wherein the dopant is selected to enable the electrical cycling of the solid-state battery cell for more than 300 electrical cycles without causing degradation of the electrochemical performance of the solid-state battery cell.
8. The solid-state battery cell of aspect 5, wherein the dopant is selected to enable the electrical cycling of the solid-state battery cell for more than 200 electrical cycles without causing degradation of the electrochemical performance of the solid-state battery cell.

9. The solid-state battery cell of aspect 5, wherein the dopant is selected to enable the electrical cycling of the solid-state battery cell at current densities greater than 2 milliamps per centimeter squared.

10. The solid-state battery cell of aspect 5, wherein the dopant is selected to enable the electrical cycling of the solid-state battery cell at current densities of 4 milliamps per centimeter squared.

11. The solid-state battery cell of aspect 5, wherein the dopant is selected to cause the solid-state battery cell to exhibit a steady-state overpotential value of 18±4 mV.

12. The solid-state battery cell of aspect 5, wherein the dopant is selected to cause the solid-state battery cell to exhibit a steady-state overpotential value of 20±4 mV.

13. The solid-state battery cell of aspect 5, wherein the dopant is selected to enable the electrical cycling of the solid-state battery cell at current densities greater than 2 milliamps per centimeter squared.

14. The solid-state battery cell of any of aspects 1 to 13, wherein the solid-state battery cell is a symmetric solid-state battery cell.

15. The solid-state battery cell of any of aspects 1 to 14, further comprising a first deposition layer disposed between the first electrode and the electrolyte such that the first oxygen-deficient interface layer is disposed between the first deposition layer and the first electrolyte surface, and a second deposition layer disposed between the second electrode and the second electrolyte surface such that the second oxygen-deficient interface layer is disposed between the second deposition layer and the second electrolyte surface.

16. The solid-state battery cell of any of aspects 1 to 15, wherein the first deposition layer is deposited by atomic layer deposition, chemical vapor deposition, molecular layer deposition, molecular beam epitaxy, sputtering, plating, chemical deposition, or physical deposition.

17. The solid-state battery cell of any of aspects 1 to 16, wherein the second deposition layer is deposited by atomic layer deposition, chemical vapor deposition, molecular layer deposition, molecular beam epitaxy, sputtering, plating, chemical deposition, or physical deposition.

18. The solid-state battery cell of any one of aspects 15 to 17, wherein the first and second deposition layers are each between 0.1 to 1 nanometer thick.

19. The solid-state battery cell of any one of aspects 15 to 17, wherein the first and second deposition layers are each between 1 to 10 nanometers thick.

20. The solid-state battery cell of any one of aspects 15 to 17, wherein the first and second deposition layers are each between 10 to 100 nanometers thick.

21. The solid-state battery cell of any one of aspects 15 to 17, wherein the first and second deposition layers are each between 100 nanometers to 1 micron thick.

22. The solid-state battery cell of any one of aspects 15 to 17, wherein the first and second deposition layers are each between 1 to 10 microns thick.

23. The solid-state battery cell of any one of aspects 15 to 17, wherein the first and second deposition layers are each between 10 to 100 microns thick.

24. The solid-state battery cell of any of aspects 1 to 23, further comprising first and second electrically conductive leads, the first electrically conductive lead being physically and electrically coupled to the first electrode, and the second electrically conductive lead being physically and electrically coupled to the second electrode.

25. The solid-state battery cell of any of aspects 15 to 24, further comprising: a first lithium layer physically coupled to the first deposition layer, wherein the first lithium layer is in electrical communication with the first deposition layer; and a second lithium layer physically coupled to the second deposition layer, wherein the second lithium layer is in electrical communication with the second deposition layer.

26. The solid-state battery cell of any of aspects 1 to 25, wherein the solid-state cell is capable of electrical cycling at current densities of 4 milliamps per centimeter squared for more than 300 electrical cycles.

27. The solid-state battery cell of any of aspects 1 to 25, wherein the solid-state cell is capable of electrical cycling at current densities greater than 2 milliamps per centimeter squared for more than 300 electrical cycles.

28. The solid-state battery cell of any of aspects 1 to 27, wherein the solid-state cell has a steady-state overpotential profile value of 18±4 mV.

29. The solid-state battery cell of any of aspects 1 to 27, wherein the solid-state cell has a steady-state overpotential profile value of 22±4 mV.

30. The solid-state battery cell of any of aspects 1 to 29, wherein the first and second oxygen-deficient interface layers enable current density cycling of the solid-state cell with current densities greater than 2 milliamps per square centimeter.

31. The solid-state battery cell of any of aspects 1 to 29, wherein the first and second oxygen-deficient interface layers enable current density cycling of the solid-state cell with current densities of 4 milliamps per square centimeter.

32. The solid-state battery cell of any aspects 1 to 31, wherein the first and second oxygen-deficient interface layers enable current density cycling of the solid-state cell for greater than 300 cycles without electrochemical degradation of the solid-state battery cell.

33. The solid-state battery cell of any of aspects 1 to 31, wherein the first and second oxygen-deficient interface layers enable current density cycling of the solid-state cell for greater than 200 cycles without electrochemical degradation of the solid-state battery cell.

34. The solid-state battery cell of any of aspects 1 to 33, wherein the first and second oxygen-deficient interface layers are configured to result in a steady-state overpotential profile value of 18±4 mV for the solid-state battery cell.

35. The solid-state battery cell of any of aspects 1 to 33, wherein the first and second oxygen-deficient interface layers are configured to result in a steady-state overpotential profile value of 22±4 mV for the solid-state battery cell.

36. The solid-state battery cell of any of aspects 1 to 35, wherein the first electrolyte surface has a surface composition comprising less than 20 at % hydroxide.

37. The solid-state battery cell of any of aspects 1 to 35, wherein the first electrolyte surface has a surface composition comprising less than 10 at % hydroxide.

38. The solid-state battery cell of any of aspects 1 to 35, wherein the first electrolyte surface has a surface composition comprising less than 5 at % hydroxide.

39. The solid-state battery cell of any of aspects 1 to 38, wherein the first electrolyte surface has a surface composition comprising less than 20 at % carbonate.

40. The solid-state battery cell of any of aspects 1 to 38, wherein the electrolyte surface has a surface composition comprising less than 10 at % carbonate.

41. The solid-state battery cell of any of aspects 1 to 38, wherein the first electrolyte surface has a surface composition comprising less than 5 at % carbonate.
42. The solid-state battery cell of any of aspects 1 to 41, wherein the second electrolyte surface has a surface composition comprising less than 20 at % hydroxide.
43. The solid-state battery cell of any of aspects 1 to 41, wherein the second electrolyte surface has a surface composition comprising less than 10 at % hydroxide.
44. The solid-state battery cell of any of aspects 1 to 41, wherein the second electrolyte surface has a surface composition comprising less than 5 at % hydroxide.
45. The solid-state battery cell of any of aspects 1 to 44, wherein the second electrolyte surface has a surface composition comprising less than 20 at % carbonate.
46. The solid-state battery cell of any of aspects 1 to 44, wherein the second electrolyte surface has a surface composition comprising less than 10 at % carbonate.
47. The solid-state battery cell of any of aspects 1 to 44, wherein the second electrolyte surface has a surface composition comprising less than 5 at % carbonate.
48. A method of fabricating a solid electrolyte for a solid-state battery cell, the method comprising: removing impurities from first and second surfaces of a solid electrolyte; depositing a first deposition layer on the first surface of the solid electrolyte; and depositing a second deposition layer on the second surface of the solid electrolyte, wherein the depositing of the first deposition layer and second deposition layer is performed in a vacuum, and wherein oxygen-deficient interfaces form at the surfaces of the solid electrolyte.
49. The method according to aspect 48, wherein removing impurities from the first and second surfaces of the solid electrolyte comprises sanding the first and second surfaces of the solid electrolyte.
50. The method according to aspect 49, wherein sanding the first and second surfaces of the solid electrolyte comprises sanding the first and second surfaces with a first sanding surface, the first sanding surface having a first grit value, and subsequently sanding the first and second surfaces with a second sanding surface, the second sanding surface having a second grit value, wherein the first grit value is less than the second grit value.
51. The method according to any of aspects 48 to 50, further heating the solid electrolyte in a vacuum prior to depositing the first and second deposition layers.
52. The method according to aspect 51, comprising heating the solid electrolyte to between 400° C. and 500° C.
53. The method according to aspect 51, comprising heating the solid electrolyte to between 300° C. and 600° C.
54. The method according to aspect 51, comprising heating the solid electrolyte to between 100° C. and 400° C.
55. The method according to aspect 51, comprising heating the solid electrolyte to a temperature that is (i) high enough to remove impurities from the first and second surfaces of the solid electrolyte, and (ii) low enough to preserve the crystal structure of the solid electrolyte.
56. The method according to any of aspects 48 to 55, comprising depositing the first deposition layer and second deposition layer in a vacuum with a pressure ranging from 760 to 25 Torr.
57. The method according to any of aspects 48 to 55, comprising depositing the first deposition layer and second deposition layer in a vacuum with a pressure ranging from 25 to 10-3 Torr.
58. The method according to any of aspects 48 to 55, comprising depositing the first deposition layer and second deposition layer in a vacuum with a pressure ranging from 10-3 to 10-9 Torr.
59. The method according to any of aspects 48 to 55, comprising depositing the first deposition layer and second deposition layer in a vacuum with a pressure ranging from 10-9 to 10-12 Torr.
60. The method according to any of aspects 48 to 55, comprising depositing the first deposition layer and second deposition layer in a vacuum with a pressure less than 10-12 Torr.
61. The method according to any of aspects 48 to 55, comprising depositing the first deposition layer and second deposition layer in an environment depleted of oxygen and water vapor.
62. The method according to any of aspects 48 to 61, comprising depositing the first deposition layer and the second deposition layer in the vacuum under conditions sufficient to allow for (i) the generation of a first oxygen-deficient interface layer at the interface of the first deposition layer and the first surface of the solid electrolyte, and (ii) the generation of a second oxygen-deficient interface layer at the interface of the second deposition layer and the second surface of the solid electrolyte.
63. The method according to any of aspects 48 to 62, wherein depositing the first deposition layer comprises depositing materials by atomic layer deposition, chemical vapor deposition, molecular layer deposition, molecular beam epitaxy, sputtering, plating, a chemical deposition, or a physical deposition.
64. The method according to any of aspects 48 to 63, wherein depositing the second deposition layer comprises depositing materials by atomic layer deposition, chemical vapor deposition, molecular layer deposition, molecular beam epitaxy, sputtering, plating, a chemical deposition, or a physical deposition.
65. A method of fabricating a solid-state battery cell comprising: removing impurities from first and second surfaces of a solid electrolyte; depositing a first deposition layer on the first surface of the solid electrolyte; depositing a second deposition layer on the second surface of the solid electrolyte, wherein the depositing of the first deposition layer and second deposition layer is performed in a vacuum, and wherein oxygen-deficient interfaces form at the surfaces of the solid electrolyte; physically coupling a first electrode to the first deposition layer, the first electrode configured to be in electrical communication with the first deposition layer; and physically coupling a second electrode to the second deposition layer, the second electrode configured to be in electrical communication with the second deposition layer.
66. The method according to aspect 65, wherein the first electrode comprises one or more of lithium, sodium, potassium, an alkaline-earth metal, or alloys thereof.
67. The method according to either aspect 65 or 66, wherein the second electrode comprises one or more of lithium, nickel, cobalt oxide, sodium, potassium, nickel lithium, aluminum oxide, nickel cobalt manganese, and an alkaline-earth metal.
68. The method according to any of aspects 65 to 67, further comprising physically and electrically coupling first and second electrically conductive leads to the first electrode and the second electrode, respectively.

69. The method according to any of aspects 65 to 68, wherein the solid electrolyte comprises one or more of more of sulfide, polymeric electrolyte, glass, lithium lanthanum zirconium oxide (LLZO), and a ion conducting solid.
70. The method according to any of aspects 65 to 69, wherein the solid electrolyte is doped with a dopant.
71. The method according to aspect 70, wherein the dopant is one or more of aluminum, tantalum, and niobium.
72. The method according to any of aspects 65 to 71, comprising depositing the first and second deposition layers to a thickness between 0.1 to 1 nanometer.
73. The method according to any of aspects 65 to 71, comprising depositing the first and second deposition layers to a thickness between 1 to 10 nanometers.
74. The method according to any of aspects 65 to 71, comprising depositing the first and second deposition layers to a thickness between 10 to 100 nanometers thick.
75. The method according to any of aspects 65 to 71, comprising depositing the first and second deposition layers to a thickness between 100 nanometers to 1 micron thick.
76. The method according to any of aspects 65 to 71, comprising depositing the first and second deposition layers to a thickness between 1 to 10 microns thick.
77. The method according to any of aspects 65 to 76, wherein the impurities comprise one or more of hydroxide, carbonate, an oxide, or a reactive oxygen species.
78. The method according to any of aspects 65 to 77, further comprising: physically coupling a first lithium layer to the first deposition layer, wherein the first lithium layer is in electrical communication with the first deposition layer; and physically coupling a second lithium layer to the second deposition layer, wherein the second lithium layer is in electrical communication with the second deposition layer.
79. The method according to any of aspects 65 to 78, wherein removing impurities from first and second surfaces of a solid electrolyte comprises reducing a hydroxide content of the first and/or second surfaces to less than 20 at %.
80. The method according to any of aspects 65 to 78, wherein removing impurities from first and second surfaces of a solid electrolyte comprises reducing the hydroxide content of the first and second surfaces to less than 10 at %.
81. The method according to any of aspects 65 to 78, wherein removing impurities from first and second surfaces of a solid electrolyte comprises reducing the hydroxide content of the first and second surfaces to less than 5 at %.
82. The method according to any of aspects 65 to 81, wherein removing impurities from first and second surfaces of a solid electrolyte comprises reducing the carbonate content of the first and second surfaces to less than 20 at %.
83. The method according to any of aspects 65 to 81, wherein removing impurities from first and second surfaces of a solid electrolyte comprises reducing the carbonate content of the first and second surfaces to less than 10 at %.
84. The method according to any of aspects 65 to 81, wherein removing impurities from first and second surfaces of a solid electrolyte comprises reducing the carbonate content of the first and second surfaces to less than 5 at %.
85. A solid-state battery cell, comprising: a first electrode comprising lithium; a second electrode comprising lithium; a solid electrolyte extending between the first and second electrodes, the solid electrolyte comprising lithium lanthanum zirconium oxide (LLZO); a first lithium deposition layer on a first surface of the solid electrolyte, wherein the first deposition layer extends between the first electrode and the first surface of the solid electrolyte; a second lithium deposition layer on a second surface of the solid electrolyte, wherein the second deposition layer extends between the second electrode and the second electrolyte; an oxygen-deficient interface at the interface of the first lithium deposition layer and the first surface of the solid electrolyte; and a second oxygen-deficient interface at the interface of the second lithium deposition layer and the second surface of the solid electrolyte.
86. The solid-state battery cell of aspect 85, wherein the solid electrolyte comprising LLZO, is comprised of aluminum doped LLZO.
87. The solid-state battery cell of aspect 85, wherein the solid electrolyte comprising LLZO, is comprised of tantalum doped LLZO.
88. The solid-state battery cell of aspect 85, wherein the solid electrolyte comprising LLZO, is comprised of niobium doped LLZO.
89. A method of fabricating a solid-state battery cell, the method comprising: sanding a first and a second surface of a lithium lanthanum zirconium oxide (LLZO) substrate; heating the LLZO substrate in a vacuum; depositing, in the vacuum, a first lithium deposition layer on the first surface of the LLZO substrate; depositing, in the vacuum, a second lithium deposition layer on the second surface of the LLZO substrate; pressing a first lithium electrode against the first lithium deposition layer, wherein the first lithium electrode is configured to be in electrical communication with the first lithium deposition layer; and pressing a second lithium electrode against the second lithium deposition layer, wherein the second lithium electrode is configured to be in electrical communication with the second lithium deposition layer.
90. The method of aspect 89, wherein the LLZO substrate comprises an aluminum doped LLZO substrate.
91. The method of aspect 89, wherein the LLZO substrate comprises a tantalum doped LLZO substrate.
92. The method of aspect 89, wherein the LLZO substrate comprises a niobium doped LLZO substrate.

What is claimed is:
1. A solid-state battery cell, comprising:
a first electrode comprising lithium metal or a lithium metal alloy, the first electrode having a first electrode first surface and an oppositely disposed first electrode second surface;
a second electrode having a second electrode first surface and an oppositely disposed second electrode second surface;
a solid electrolyte comprising a cubic lithium ion conducting metal oxide, the solid electrolyte extending between the first and second electrodes and the solid electrolyte having oppositely disposed first and second electrolyte surfaces, wherein the first electrolyte surface is in facing relation to the first electrode second surface and the second electrolyte surface is in facing relation to the second electrode first surface; and a first oxygen-deficient interface layer formed by reduction of the first electrolyte surface of the solid electrolyte, the first oxygen-deficient interface layer formed in the solid electrolyte at an interface between the first electrolyte surface and the first electrode second surface, and the first oxygen-deficient interface layer extending only partially through the solid electrolyte, wherein the solid electrolyte has an ionic conductivity in the range of $0.1 \times 10^{-3}$ to $10 \times 10^{-2}$ S/cm at temperatures of 66° F. to 74° F., wherein the oxygen-deficient layer has a thickness of less than 10 nm.

2. The solid-state battery cell of claim 1, wherein the second electrode comprises one or more of lithium nickel manganese cobalt oxide, lithium nickel manganese oxide, lithium nickel cobalt aluminum oxide, or lithium iron phosphate.

3. The solid-state battery cell of claim 1, wherein the electrolyte comprises lithium lanthanum zirconium oxide (LLZO).

4. The solid-state battery cell of claim 1, wherein the electrolyte is doped with one or more of aluminum, tantalum, and niobium.

5. The solid-state battery cell of claim 1, further comprising a second oxygen-deficient interface layer disposed between the second electrolyte surface and the second electrode first surface.

6. The solid-state battery cell of claim 1, further comprising a first deposition layer disposed between the first electrode and the electrolyte such that the first oxygen-deficient interface layer is disposed between the first deposition layer and the first electrolyte surface.

7. The solid-state battery cell of claim 6, wherein the first deposition layer is deposited in a vacuum.

8. The solid-state battery cell of claim 6, further comprising:
a first lithium layer physically coupled to the first deposition layer, wherein the first lithium layer is in electrical communication with the first deposition layer.

9. The solid-state battery cell of claim 1, wherein the solid-electrolyte comprises a material having a crystalline structure.

10. The solid-state battery cell of claim 1, wherein the solid electrolyte comprises at least one of doped lithium lanthanum zirconium oxide (LLZO), undoped LLZO, doped lithium lanthanum titanium oxide (LLTO), and undoped LLTO.

11. The solid-state battery cell of claim 10, wherein the solid electrolyte comprises doped LLZO.

12. The solid-state battery cell of claim 10, wherein the solid electrolyte comprises undoped LLZO.

13. The solid-state battery cell of claim 10, wherein the solid electrolyte comprises doped LLTO.

14. The solid-state battery cell of claim 10, wherein the solid electrolyte comprises undoped LLTO.

15. A solid-state battery cell, comprising:
a first electrode comprising lithium;
a second electrode comprising one or more of lithium nickel manganese cobalt oxide, lithium nickel cobalt aluminum oxide, or lithium nickel manganese oxide;
a solid electrolyte extending between the first and second electrodes, the solid electrolyte comprising cubic lithium lanthanum zirconium oxide (LLZO);
a first lithium deposition layer on a first surface of the solid electrolyte, wherein the first deposition layer extends between the first electrode and the first surface of the solid electrolyte; and
an oxygen-deficient interface at an interface of the first lithium deposition layer and the first surface of the solid electrolyte and formed by reduction of the first surface of the solid electrolyte, the oxygen deficient interface extending only partially through the solid electrolyte, wherein the solid electrolyte has a conductivity in the range of $0.1 \times 10^{-3}$ to $10 \times 10^{-2}$ S/cm at temperatures of 66° F. to 74° F., wherein the oxygen-deficient layer has a thickness of less than 10 nm.

16. A solid-state battery cell, comprising:
a first electrode comprising lithium metal or a lithium metal alloy, the first electrode having a first electrode first surface and an oppositely disposed first electrode second surface;
a second electrode having a second electrode first surface and an oppositely disposed second electrode second surface;
a solid electrolyte comprising a cubic lithium ion conducting metal oxide, the solid electrolyte extending between the first and second electrodes and the solid electrolyte having oppositely disposed first and second electrolyte surfaces, wherein the first electrolyte surface is in facing relation to the first electrode second surface and the second electrolyte surface is in facing relation to the second electrode first surface;
a first oxygen-deficient interface layer formed by reduction of the first electrolyte surface of the solid electrolyte, the first oxygen-deficient interface layer formed in the solid electrolyte at an interface between the first electrolyte surface and the first electrode second surface, and the first oxygen-deficient interface layer extending only partially through the solid electrolyte, wherein the solid electrolyte has an ionic conductivity in the range of $0.1 \times 10^{-3}$ to $10 \times 10^{-2}$ S/cm at temperatures of 66° F. to 74° F.; and
a first deposition layer disposed between the first electrode and the electrolyte such that the first oxygen-deficient interface layer is disposed between the first deposition layer and the first electrolyte surface,
wherein the first deposition layer is deposited in a vacuum.

* * * * *